United States Patent
Ishii et al.

(10) Patent No.: US 9,830,293 B2
(45) Date of Patent: Nov. 28, 2017

(54) INFORMATION PROCESSING APPARATUS, STORAGE SYSTEM, AND COMPUTER-READABLE NON-TRANSITORY STORAGE MEDIUM STORING COMMUNICATION CONTROL PROGRAM

(71) Applicant: FUJITSU LIMITED, Kawasaki-shi, Kanagawa (JP)

(72) Inventors: Takanori Ishii, Nerima (JP); Kazuko Sakurai, Koganei (JP); Yohei Nuno, Kawasaki (JP); Tatsuya Shinozaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 181 days.

(21) Appl. No.: 14/818,814

(22) Filed: Aug. 5, 2015

(65) Prior Publication Data

US 2016/0041938 A1     Feb. 11, 2016

(30) Foreign Application Priority Data

Aug. 11, 2014 (JP) .................................. 2014-163607
Jun. 12, 2015 (JP) .................................. 2015-119261

(51) Int. Cl.
*G06F 13/38* (2006.01)
*G06F 13/40* (2006.01)
*G06F 13/42* (2006.01)

(52) U.S. Cl.
CPC ...... *G06F 13/4054* (2013.01); *G06F 13/4282* (2013.01)

(58) Field of Classification Search
None
See application file for complete search history.

(56) References Cited

U.S. PATENT DOCUMENTS

| 6,160,639 A * | 12/2000 | Lutgen ............... H04N 1/33323 |
| | | 358/412 |
| 8,213,312 B2 * | 7/2012 | Saito ........................ H04L 45/00 |
| | | 370/229 |
| 2006/0179216 A1 | 8/2006 | Chikamichi |
| 2008/0016265 A1 | 1/2008 | Oshikiri et al. |
| 2011/0004722 A1 | 1/2011 | Jeddeloh |

FOREIGN PATENT DOCUMENTS

| JP | 2006-221271 | 8/2006 |
| JP | 2008-21024 | 1/2008 |
| JP | 2008-42851 | 2/2008 |
| JP | 2010-122762 | 6/2010 |
| JP | 2012-532398 | 12/2012 |
| JP | 2014-2637 | 1/2014 |

* cited by examiner

*Primary Examiner* — Cheng-Yuan Tseng
(74) *Attorney, Agent, or Firm* — Staas & Halsey LLP

(57) ABSTRACT

An information processing apparatus includes: an interface unit that communicates with another device through a plurality of physical links; a setting unit that determines a value of a setting parameter for setting a signal transmission characteristic for each of the plurality of physical links by performing a negotiation with the other device and that outputs a plurality of determined values of the setting parameter, each of the plurality of determined values corresponding to one of the plurality of physical links; and a judgment unit that judges whether each of the plurality of determined values is correct or not by judging whether or not a difference between a maximum value and a minimum value among the plurality of determined values falls within a predetermined range.

10 Claims, 29 Drawing Sheets

FIG. 9

| MESSAGE LIST | | | |
|---|---|---|---|
| MESSAGE CODE | PARAMETER C1 | PARAMETER C2 | PARAMETER C3 |
| 00h | ±0 | ±0 | ±0 |
| 01h | ±0 | ±0 | +1 |
| 02h | ±0 | ±0 | −1 |
| 04h | ±0 | +1 | ±0 |
| 05h | ±0 | +2 | +2 |
| 08h | ±0 | −1 | ±0 |
| 0Ah | ±0 | −2 | −2 |
| 10h | +1 | ±0 | ±0 |
| 14h | +2 | +2 | ±0 |
| 20h | −1 | ±0 | ±0 |
| 28h | −2 | −2 | ±0 |

| Tx PARAMETER TABLE | | | | 332 |
|---|---|---|---|---|
| WIDE PORT ID | PHYSICAL LINK ID | PARAMETER TYPE | SETTING VALUE | |
| WP#1 | LN#1 | C1 | 9 | |
| | | C2 | 12 | |
| | | C3 | 13 | |
| | LN#2 | C1 | 11 | |
| | | C2 | 11 | |
| | | C3 | 14 | |
| | LN#3 | C1 | 10 | |
| | | C2 | 14 | |
| | | C3 | 15 | |
| | LN#4 | C1 | 12 | |
| | | C2 | 13 | |
| | | C3 | 4 | |

FIG. 22

| Tx TRAINING TABLE | | | | 333 |
|---|---|---|---|---|
| WIDE PORT ID | PHYSICAL LINK ID | PARAMETER TYPE | SETTING VALUE | |
| WP#1 | LN#1 | C1 | 10 | |
| | | C2 | 11 | |
| | | C3 | 14 | |
| | LN#2 | C1 | 11 | |
| | | C2 | 15 | |
| | | C3 | 16 | |
| | ... | ... | ... | |
| WP#2 | LN#1 | C1 | 12 | |
| | | C2 | 12 | |
| | | C3 | 15 | |
| | LN#2 | C1 | 13 | |
| | | C2 | 14 | |
| | | C3 | 5 | |
| | ... | ... | ... | |

FIG. 23

| Tx ALLOWABLE RANGE TABLE | | | 334 |
|---|---|---|---|
| WIDE PORT ID | PARAMETER TYPE | RANGE | |
| WP#1 | C1 | 7-9 | |
| | C2 | 8-10 | |
| | C3 | 9-11 | |
| WP#2 | C1 | 8-10 | |
| | C2 | 8-10 | |
| | C3 | 10-12 | |

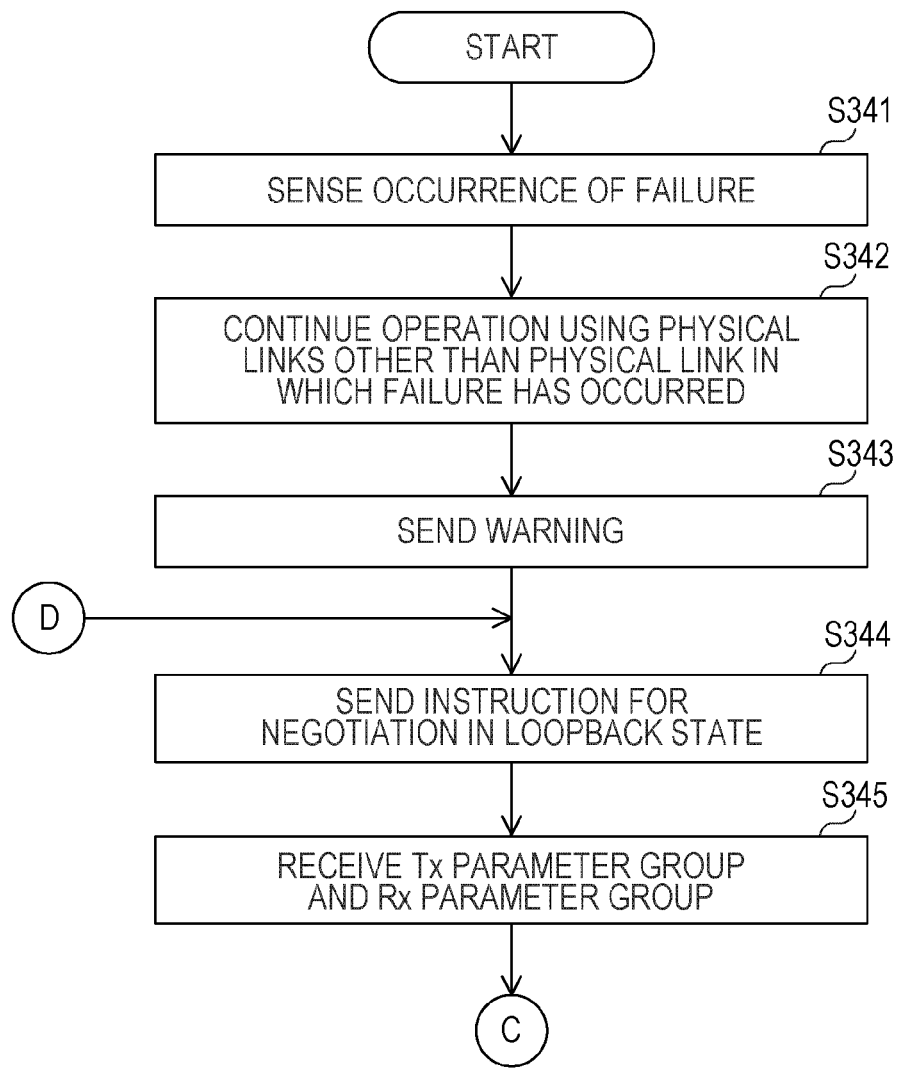

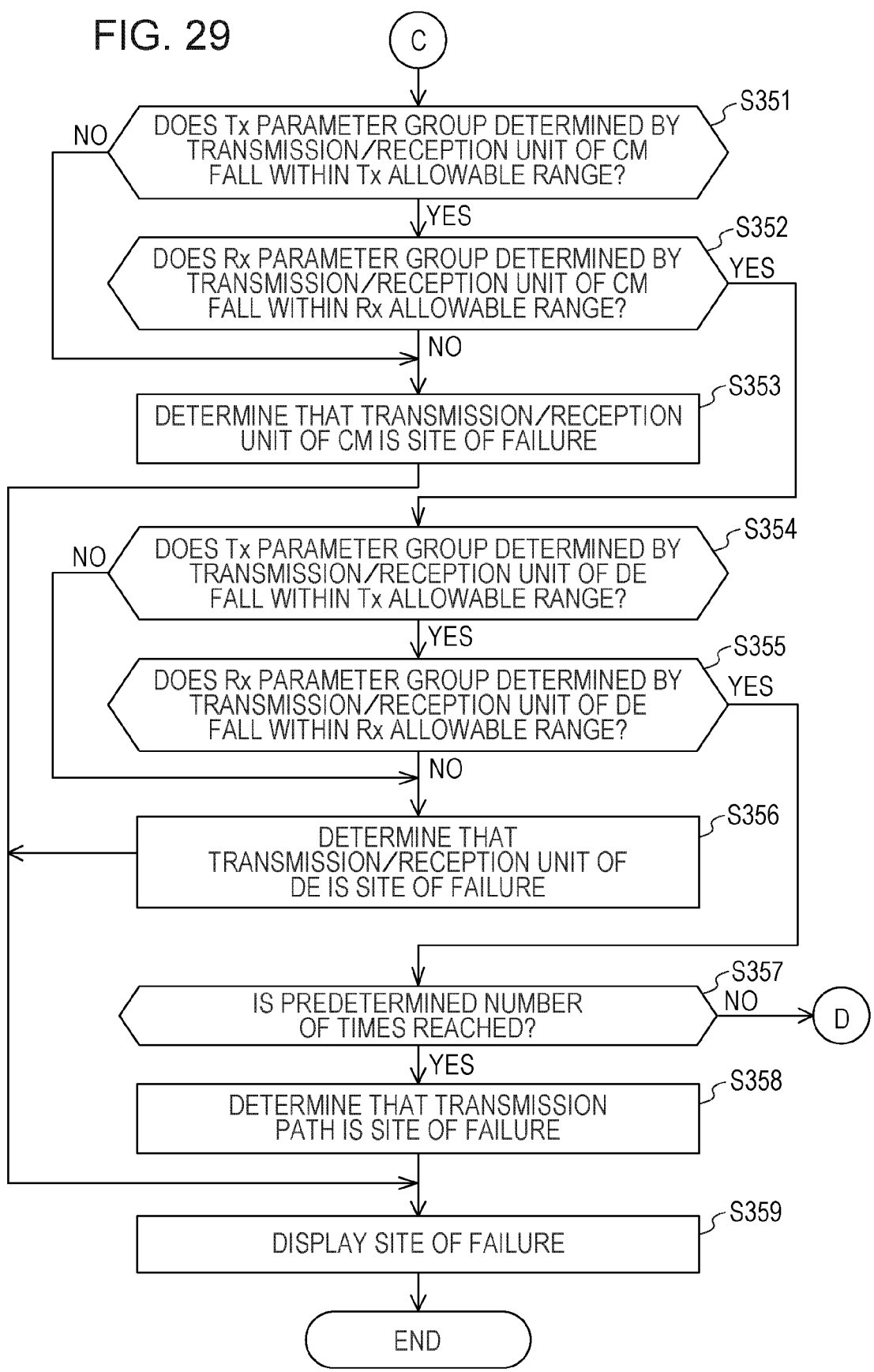

INFORMATION PROCESSING APPARATUS, STORAGE SYSTEM, AND COMPUTER-READABLE NON-TRANSITORY STORAGE MEDIUM STORING COMMUNICATION CONTROL PROGRAM

CROSS-REFERENCE TO RELATED APPLICATIONS

This application is based upon and claims the benefit of priority of the prior Japanese Patent Application No. 2015-119261, filed on Jun. 12, 2015, and the prior Japanese Patent Application No. 2014-163607, filed on Aug. 11, 2014, the entire contents of which are incorporated herein by reference.

FIELD

The embodiments discussed herein are related to an information processing apparatus, a storage system, and a computer-readable non-transitory storage medium storing a communication control program.

BACKGROUND

Serial transmission has been increasingly used for high-speed transfer of signals within an information processing apparatus or between an information processing apparatus and a peripheral device. Typical standards for such high-speed serial transmission include Peripheral Component Interconnect Express (PCI Express) (hereinafter abbreviated as PCIe) and serial-attached Small Computer System Interface (SCSI), called SAS.

Interface circuits based on the high-speed serial transmission standards described above execute a training sequence for optimizing settings when connection is initiated. For example, the SAS standard defines a test signal pattern for training and a message for requesting the partner to increase or decrease a setting value of a parameter.

Techniques for optimization of a parameter are as follows. For example, a technique has been proposed in which hard disk drive (HDD) mounting position information and HDD identification information are matched with a transmission optimization parameter table to determine a data transmission parameter so that an optimal transmission function can be set for each HDD.

There has also been proposed a technique for optimization of a parameter used for data transfer, in which even when a high-speed serial bus is applied to data communication devices having complex operation modes, a parameter used for data transfer in each traffic, such as a packet size, is adjusted so that a transfer rate of each traffic present between data communication devices connected via a high-speed serial bus has a preset target value.

Japanese Laid-open Patent Publication No. 2006-221271 and Japanese Laid-open Patent Publication No. 2008-021024 are examples of related art.

A transmit-side SAS interface receives a message for requesting an increase or decrease in a setting value of a parameter, as described above, from the receive side and negotiates with the receive side to optimize a parameter for setting a signal transmission characteristic. However, a setting value determined by a negotiation may not always be optimal depending on the conditions such as the length of the transmission path, and even the use of a setting value determined by a negotiation may result in the occurrence of a communication failure. A PCIe interface may also experience a similar issue.

It is therefore desirable to provide an information processing apparatus, a storage system, and a computer-readable non-transitory storage medium storing a communication control program with improvement in communication stability.

SUMMARY

According to an aspect of the invention, an information processing apparatus comprising: an interface unit that communicates with another device through a plurality of physical links; a setting unit that determines a value of a setting parameter for setting a signal transmission characteristic for each of the plurality of physical links by performing a negotiation with the other device and that outputs a plurality of determined values of the setting parameter, each of the plurality of determined values corresponding to one of the plurality of physical links; and a judgment unit that judges whether each of the plurality of determined values is correct or not by judging whether or not a difference between a maximum value and a minimum value among the plurality of determined values falls within a predetermined range.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating an example of a message list;

FIG. 11 is a diagram illustrating an example of a Tx parameter table;

FIG. 22 is a diagram illustrating an example of a Tx training table;

FIG. 23 is a diagram illustrating an example of a Tx allowable range table;

FIG. 28 is a flowchart illustrating an example (part 1) of a process for locating the site of failure; and FIG. 29 is a flowchart illustrating an example (part 2) of the process for locating the site of failure.

DESCRIPTION OF EMBODIMENTS

Embodiments discussed herein will be described hereinafter with reference to the drawings.

First Embodiment

Figure 1:
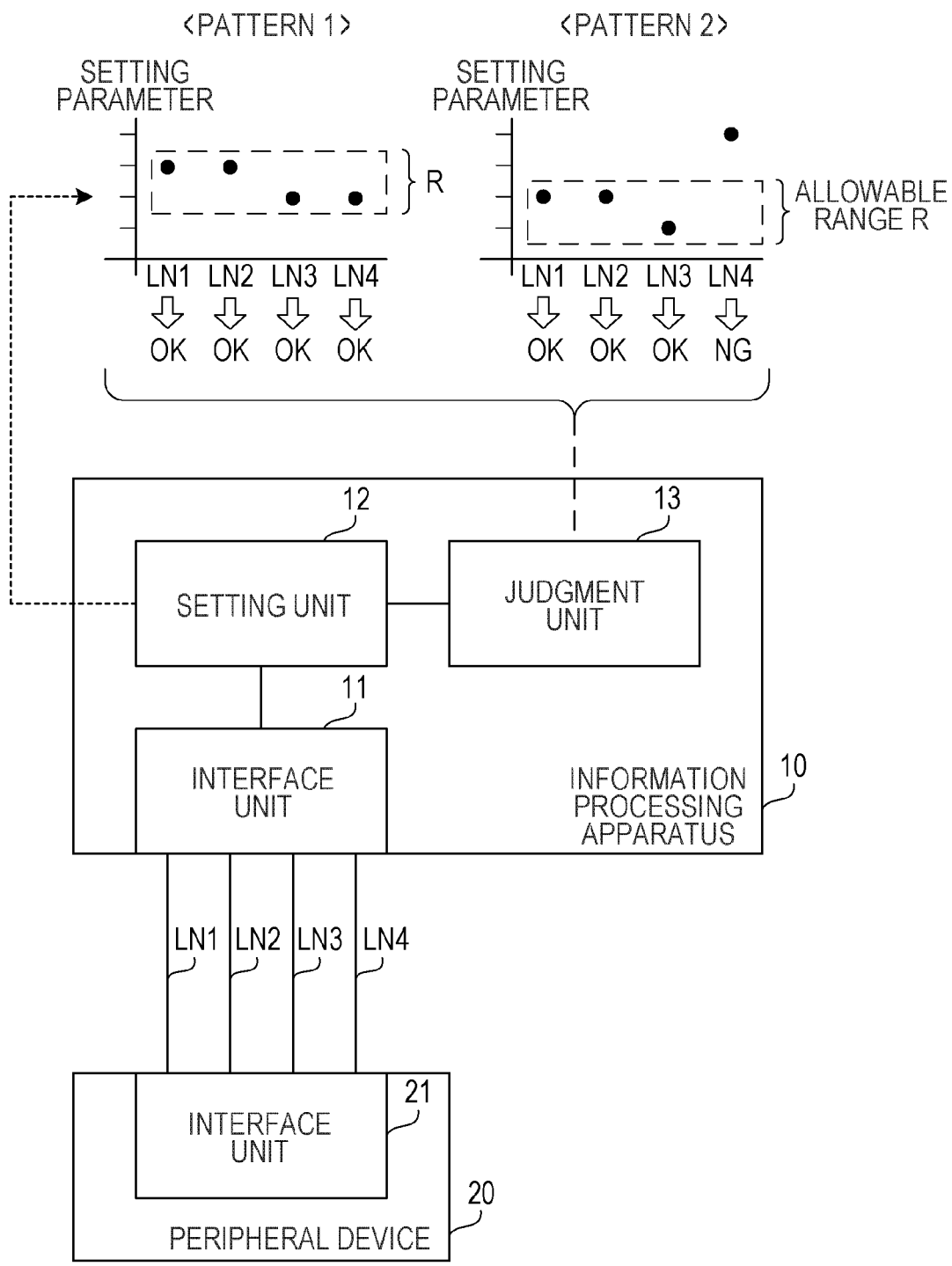
FIG. 1 is a diagram illustrating an example configuration and example process of an information processing apparatus according to a first embodiment.

FIG. 1 is a diagram illustrating an example configuration and example process of an information processing apparatus 10 according to a first embodiment. A peripheral device 20 is connected to the information processing apparatus 10 illustrated in FIG. 1 as an example of a communication partner device. The information processing apparatus 10 communicates with the peripheral device 20 through a plurality of physical links LN1 to LN4. For example, the information processing apparatus 10 uses the physical links LN1 to LN4 collectively as a single logical communication port to perform communication. The type of connection described above supports multiple lanes in PCIe-based communication between the information processing apparatus 10 and the peripheral device 20, and wide ports in SAS-based communication between the information processing apparatus 10 and the peripheral device 20.

The information processing apparatus 10 includes an interface unit 11, a setting unit 12, and a judgment unit 13.

The interface unit 11 communicates with the peripheral device 20 through the physical links LN1 to LN4. Further, the interface unit 11 adjusts signal transmission characteristics for each of the physical links LN1 to LN4. Examples of the adjustment performed by the interface unit 11 include pre-emphasis and pre-shoot.

The setting unit 12 determines a value of a setting parameter of the interface unit 11 for adjusting a signal transmission characteristic for each of the physical links LN1 to LN4 by performing a negotiation with an interface unit 21 of the peripheral device 20. For example, while varying the value of the setting parameter of the interface unit 11 for each of the physical links LN1 to LN4, the setting unit 12 causes the interface unit 11 to transmit a test signal through the corresponding one of the physical links LN1 to LN4. The setting unit 12 determines the values of the setting parameter which are obtained when a negotiation termination notification is received from the interface unit 21 of the peripheral device 20 to be optimal.

The judgment unit 13 judges whether each of the determined values of the setting parameter which are respectively determined for the physical links LN1 to LN4 by the setting unit 12 is correct or not by judging whether or not a difference between the maximum value and the minimum value among the determined values of the setting parameter falls within a predetermined allowable range R.

For example, in Pattern 1 illustrated in the upper left portion of FIG. 1, a difference between the maximum value and the minimum value among the determined respective values of the setting parameter for the physical links LN1 to LN4 falls within the allowable range R. In this case, the judgment unit 13 judges that all the determined respective values of the setting parameter for the physical links LN1 to LN4 are correct, and initiates communication with the determined values being set in the interface unit 11 as values of the setting parameter.

In Pattern 2 illustrated in the upper right portion of FIG. 1, in contrast, a difference between the maximum value and the minimum value among the determined respective values of the setting parameter for the physical links LN1 to LN4 does not fall within the allowable range R. In this case, the judgment unit 13 causes the setting unit 12 to perform a renegotiation for, for example, a physical link corresponding to a remaining determined value other than the determined values that fall within the allowable range R among the determined values of the setting parameter.

In the example illustrated in FIG. 1, the judgment unit 13 causes the setting unit 12 to perform a renegotiation for the physical link LN4. As a result, if a difference between the maximum value and the minimum value among all determined values of the setting parameter including the determined value for the physical link LN4 which has been determined by the renegotiation and the determined values for the physical links LN1 to LN3 which have been determined by the negotiation performed for the first time falls within the allowable range R, the judgment unit 13 initiates communication with all the determined values of the setting parameter being set in the interface unit 11 as values of the setting parameter. On the other hand, for example, if the difference between the maximum value and the minimum value among all the determined values of the setting parameter does not fall within the allowable range R even after the renegotiation has been completed, the judgment unit 13 initiates communication by enabling only the physical links corresponding to the determined values that fall within the allowable range R and disconnecting the other physical link or physical links.

The processing procedure for a negotiation is not determined considering every situation. For this reason, the value of a setting parameter which is determined by a negotiation for each physical link may not always be optimal depending on the conditions.

For example, there may be a difference in specifications between a transmission path assumed by the vendor of the interface unit 21 that judges the appropriateness of the setting of signal transmission characteristics and an actual transmission path. Such a difference in specifications between the transmission paths may be a difference in length between the transmission paths. In particular, as in the example illustrated in FIG. 1, in a configuration in which the information processing apparatus 10 communicates with the peripheral device 20, which is an external peripheral device, an actual transmission path may be longer than a transmission path assumed by the vendor of the interface unit 21.

In addition, the vendor of a communication interface of the information processing apparatus 10 may be different from the vendor of a communication interface of the peripheral device 20. Additionally, a device in a communication interface may malfunction or a characteristic anomaly may emerge in a transmission path on a substrate.

On the contrary, as illustrated in FIG. 1, a configuration in which communication takes place between a pair of devices, that is, between the interface units 11 and 21, through the plurality of physical links LN1 to LN4 is presumed to provide a small difference in transmission path characteristics among the physical links LN1 to LN4. For this reason, the optimal values of the setting parameter for the physical links LN1 to LN4 are likely to be close to one another.

Making use of the features described above, the judgment unit 13 judges whether each of the determined values of the setting parameter which are determined for the physical links LN1 to LN4 by a negotiation is correct or not by judging whether or not a difference between the maximum value and the minimum value among the determined values of the setting parameter is within the allowable range R. Communication using the values of the setting parameter judged to be correct in the judgment process described above reduces the probability of occurrence of a communication failure caused by the reasons described above, and improves communication stability.

Second Embodiment

Figure 2:
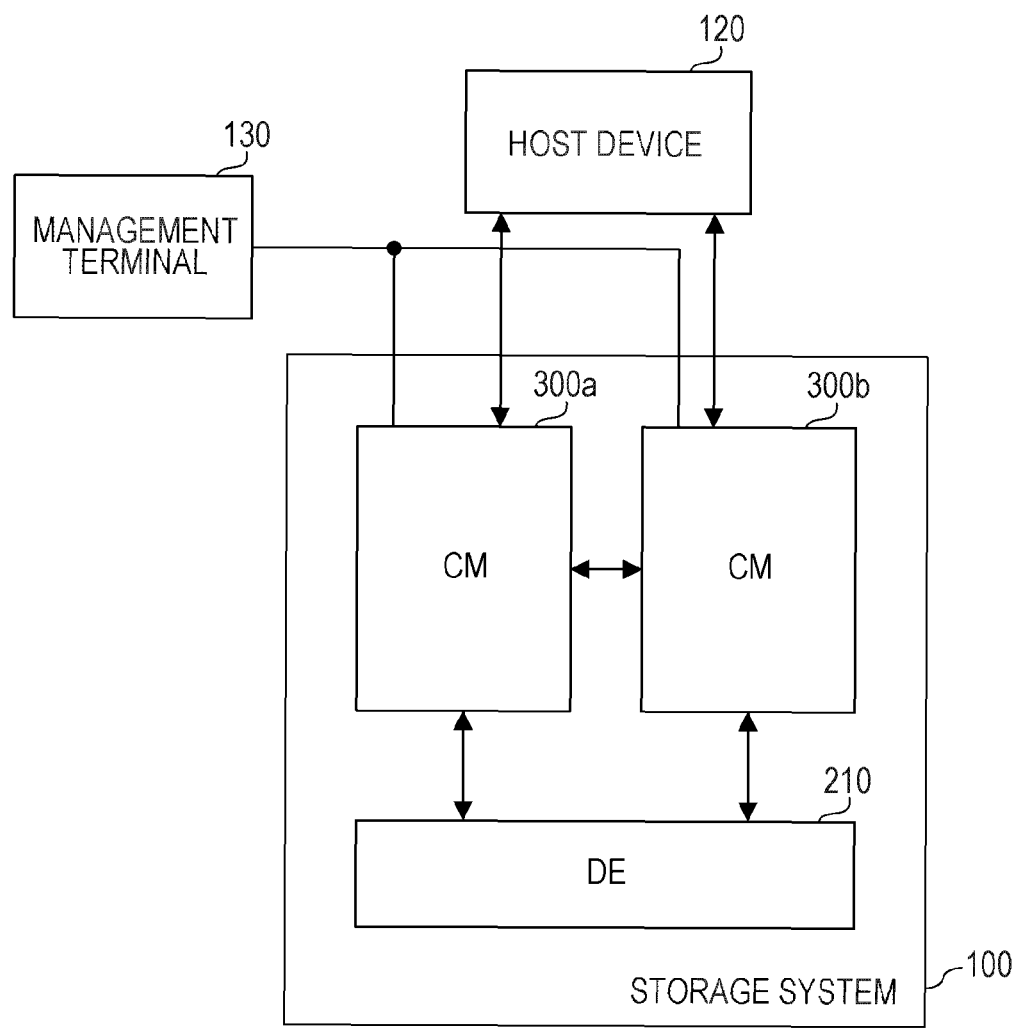
FIG. 2 is a diagram illustrating an example of a storage system according to a second embodiment.

FIG. 2 is a diagram illustrating an example of a storage system 100 according to a second embodiment. The storage system 100 illustrated in FIG. 2 is provided with a plurality of HDDs which form a storage device. The plurality of HDDs that form the storage device are included in a drive enclosure (DE) 210 in the storage system 100. The storage system 100 further includes two controller modules (CMs) 300a and 300b that control access to the HDDs in the DE 210. For example, the DE 210 may be disposed outside the storage system 100. Furthermore, the storage units that form the storage device are not limited to HDDs, and any other kind of storage device, such as a storage device including solid state drives (SSDs), may be used.

A host device 120 is connected to the storage system 100. In response to a user's operation, the host device 120 requests the CM 300a or the CM 300b in the storage system 100 to access an HDD in the DE 210.

Each of the CMs 300a and 300b is a storage control device that controls access to an HDD in the DE 210 in accordance with an access request from the host device 120. For example, upon acceptance of a request for reading data stored in an HDD in the DE 210 from the host device 120, each of the CMs 300a and 300b reads the requested data from the HDD in the DE 210, and transmits the read data to the host device 120. Upon acceptance of a request for writing data to an HDD in the DE 210 from the host device 120, each of the CMs 300a and 300b writes the requested data to the HDD in the DE 210.

A management terminal 130 is connected to the CMs 300a and 300b. The management terminal 130 is a client computer used by an administrator. For example, the administrator uses the management terminal 130 to check whether or not the storage system 100 is in normal operation.

Figure 3:
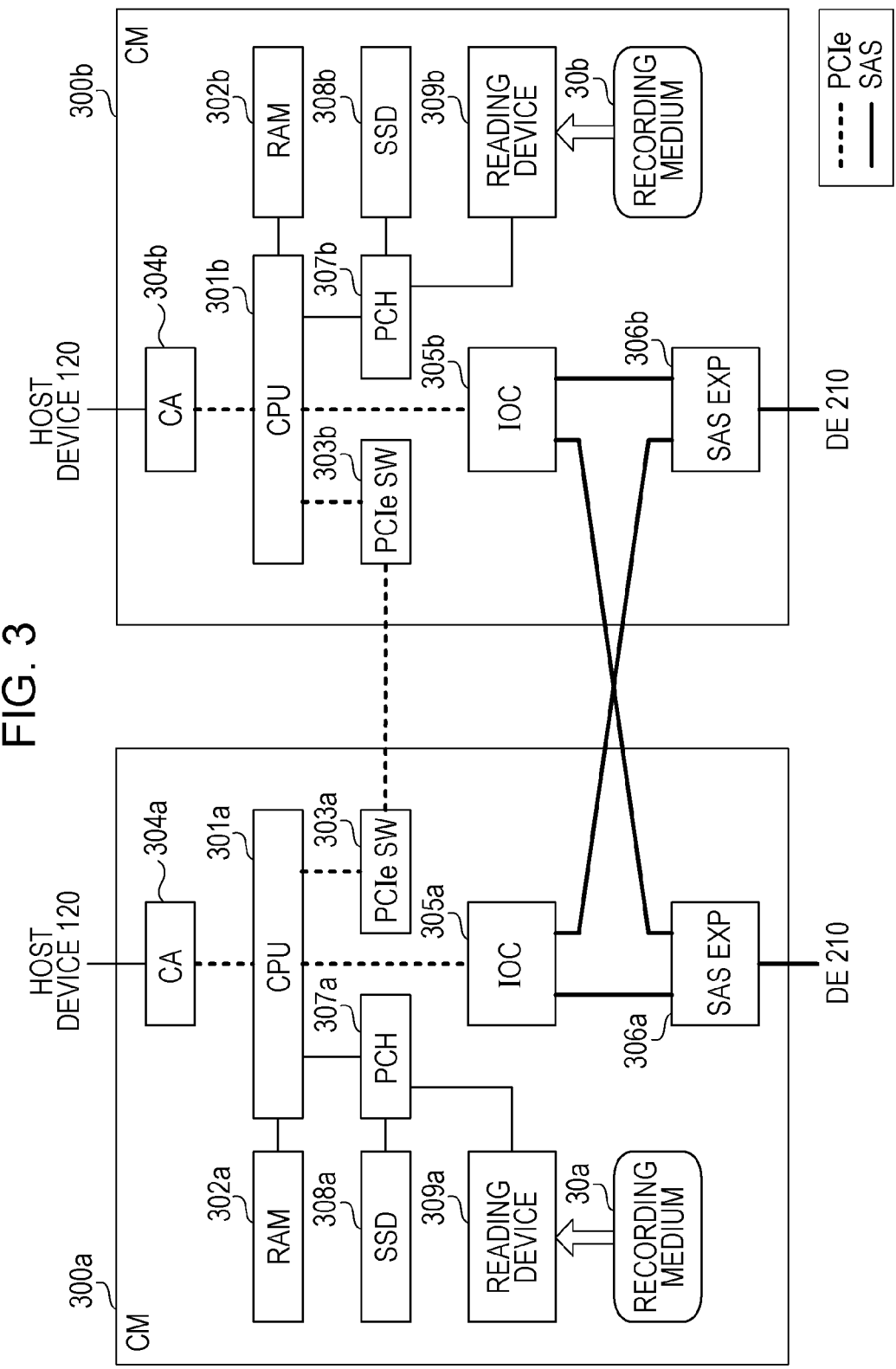
FIG. 3 is a diagram illustrating an example hardware configuration of CMs in the storage system.

FIG. 3 is a diagram illustrating an example hardware configuration of the CMs 300a and 300b in the storage system 100. The CM 300a includes a central processing unit (CPU) 301a, a random access memory (RAM) 302a, a PCIe switch 303a, a channel adapter (CA) 304a, an in/out controller (IOC) 305a, a SAS expander 306a, a platform controller hub (PCH) 307a, an SSD 308a, and a reading device 309a.

The CM 300b is implemented using substantially the same hardware configuration as that of the CM 300a. That is, the CM 300b includes a CPU 301b, a RAM 302b, a PCIe switch 303b, a CA 304b, an IOC 305b, a SAS expander 306b, a PCH 307b, an SSD 308b, and a reading device 309b, which correspond to the CPU 301a, the RAM 302a, the PCIe switch 303a, the CA 304a, the IOC 305a, the SAS expander 306a, the PCH 307a, the SSD 308a, and the reading device 309a in the CM 300a, respectively. Thus, the description will be made basically of the hardware configuration of the CM 300a, and the hardware configuration of the CM 300b is not described herein.

The CPU 301a collectively controls the overall operation of the CM 300a. The RAM 302a is used as a main memory device of the CM 300a, and temporarily stores at least a portion of a program to be executed by the CPU 301a and various kinds of data used for the processing performed by the program. The RAM 302a is also used as a cache region for data stored in an HDD in the DE 210.

The PCIe switch 303a is connected to the CPU 301a via a PCIe bus. The PCIe switch 303a is also connected to the PCIe switch 303b in the CM 300b via a PCIe cable.

Here, the CPU 301a of the CM 300a and the CPU 301b of the CM 300b are designed to be capable of communicating with each other through a communication path between the PCIe switch 303a and the PCIe switch 303b. For example, the CPU 301a of the CM 300a is capable of obtaining failure detection information indicating the details of a failure which has occurred in the other CM, that is, the CM 300b, from the CPU 301b of the CM 300b through the communication path. Furthermore, for example, each of the CPUs 301a and 301b is also capable of transmitting cached data in an HDD which is stored in the corresponding one of the RAMs 302a and 302b to the CPU of the other CM through the communication path and requesting that the cached data be backed up on the RAM in the other CM.

The CA 304a is connected to the CPU 301a via a PCIe bus. The CA 304a executes an interface process to transmit and receive data between the CPU 301a and the host device 120.

The IOC 305a is connected to the CPU 301a via a PCIe bus. The IOC 305a is further connected to the SAS expander 306a and the SAS expander 306b of the CM 300b via SAS cables. The IOC 305a executes an interface process between the CPU 301a and an HDD in the DE 210, which is a SAS device. That is, the IOC 305a includes a PCIe controller that controls communication based on the PCIe standard, and a SAS controller that controls communication based on the SAS standard.

The SAS expander 306a is connected to the IOC 305a and is also connected to the IOC 305b of the CM 300b via a SAS cable. Further, the SAS expander 306a is connected to a SAS device (for example, an HDD or a SAS expander) in the DE 210 via a SAS cable. The SAS expander 306a relays data between the SAS controllers in the IOCs 305a and 305b and the SAS devices.

Here, the IOC 305a of the CM 300a is connected to the DE 210 through the SAS expander 306a of the CM 300a. In addition, the IOC 305a of the CM 300a is connected to the DE 210 through the SAS expander 306b in the CM 300b. In the manner described above, the connection between the IOC 305a and the DE 210 through the two SAS expanders 306a and 306b provides redundant access paths from the IOC 305a to the DE 210.

Similarly, the IOC 305b of the CM 300b is connected to the DE 210 through the SAS expander 306b of the CM 300b. In addition, the IOC 305b of the CM 300b is connected to the DE 210 through the SAS expander 306a in the CM 300a. In the manner described above, the connection between the IOC 305b and the DE 210 through the two SAS expanders 306a and 306b also provides redundant access paths from the IOC 305b to the DE 210.

The PCH 307a transmits and receives data between the CPU 301a and each of the SSD 308a and the reading device 309a. The SSD 308a is used as a secondary memory device of the CM 300a, and stores, for example, a program to be executed by the CPU 301a and various kinds of data used for the execution of the program. The secondary memory device may be any other type of non-volatile memory device, such as an HDD. A portable recording medium 30a is removably inserted into the reading device 309a. The reading device 309a reads data recorded on the recording medium 30a and transmits the read data to the CPU 301a. Examples of the recording medium 30a include an optical disk, a magneto-optical disk, and a semiconductor memory.

A communication interface (not illustrated) is further connected to the PCH 307a to transmit and receive data between the CPU 301a and the management terminal 130.

Figure 4:
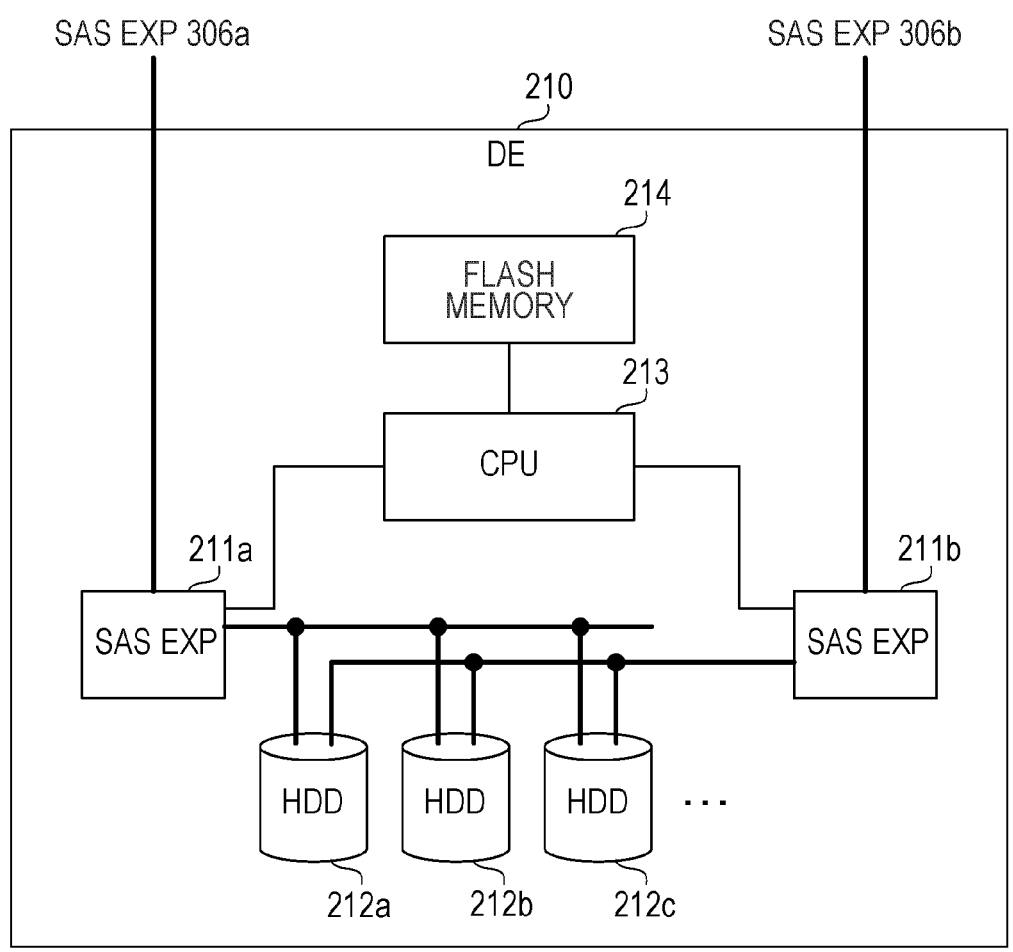
FIG. 4 is a diagram illustrating an example hardware configuration of a DE.

FIG. 4 is a diagram illustrating an example hardware configuration of the DE 210. The DE 210 includes SAS expanders 211a and 211b, a plurality of HDDs 212a, 212b, 212c, and so forth, a CPU 213, and a flash memory 214.

The SAS expander 211a is connected to the SAS expander 306a of the CM 300a and to the HDDs 212a, 212b, 212c, and so forth in the DE 210 via SAS cables. The SAS expander 211a relays data between the SAS expander 306a of the CM 300a and the HDDs 212a, 212b, 212c, and so forth in the DE 210.

The SAS expander 211b is connected to the SAS expander 306b of the CM 300b and to the HDDs 212a, 212b, 212c, and so forth in the DE 210 via SAS cables. The SAS expander 211b relays data between the SAS expander 306b of the CM 300b and the HDDs 212a, 212b, 212c, and so forth in the DE 210.

The CPU 213 collectively controls the overall hardware of the DE 210. The flash memory 214 stores various kinds of data and a program of firmware.

Next, communication between SAS controllers will be described. The SAS controllers are interface circuits used for communication via SAS cables. In the examples illustrated in FIGS. 3 and 4, a SAS controller is mounted in each of the IOCs 305a and 305b and the SAS expanders 306a, 306b, 211a, and 211b.

The following description will be made of, in particular, communication between different devices via a SAS cable. For example, the description is intended to depict communication between the IOC 305a and the SAS expander 306b, communication between the IOC 305b and the SAS expander 306a, communication between the SAS expander 306a and the SAS expander 211a in the DE 210, and communication between the SAS expander 306b and the SAS expander 211b in the DE 210.

Figure 5:
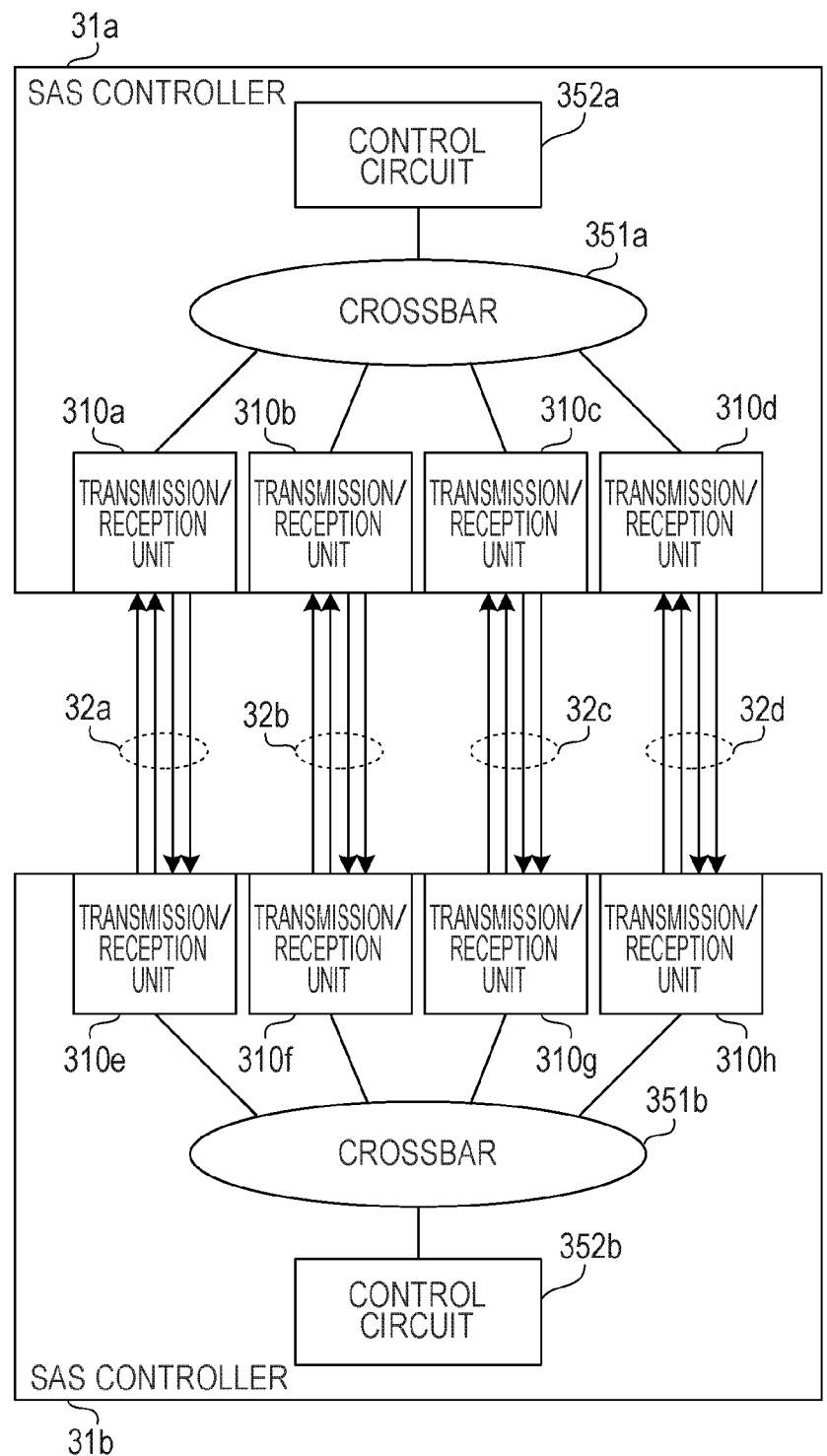
FIG. 5 is a diagram illustrating an example of main components of SAS controllers and illustrating how the SAS controllers are connected to each other.

FIG. 5 is a diagram illustrating an example of main components of SAS controllers 31a and 31b and illustrating how the SAS controllers 31a and 31b are connected to each other. In FIG. 5, the SAS controller 31a includes transmission/reception units 310a to 310d, a crossbar 351a, and a control circuit 352a. The SAS controller 31b includes transmission/reception units 310e to 310h, a crossbar 351b, and a control circuit 352b.

The transmission/reception unit 310a is connected to the transmission/reception unit 310e, and the transmission/reception unit 310b is connected to the transmission/reception unit 310f. The transmission/reception unit 310c is connected to the transmission/reception unit 310g, and the transmission/reception unit 310d is connected to the transmission/reception unit 310h. Each of the transmission/reception units 310a to 310h controls transmission and reception of data to and from the transmission/reception unit connected thereto.

Physical links 32a, 32b, 32c, and 32d are transmission paths of data to be transmitted and received between the SAS controller 31a and the SAS controller 31b. Specifically, the physical link 32a is a transmission path of data between the transmission/reception unit 310a and the transmission/reception unit 310e, and the physical link 32b is a transmission path of data between the transmission/reception unit 310b and the transmission/reception unit 310f. The physical link 32c is a transmission path of data between the transmission/reception unit 310c and the transmission/reception unit 310g, and the physical link 32d is a transmission path of data between the transmission/reception unit 310d and the transmission/reception unit 310h. Each of the physical links 32a, 32b, 32c, and 32d is a set of differential signal line pairs, and includes a signal line pair (two signal lines) for transmission and a signal line pair (two signal lines) for reception.

The transmission/reception units 310a to 310d are connected to the sets of differential signal pairs, each set forming one of the physical links 32a to 32d, via a common connector. Also, the transmission/reception units 310e to 310h are connected to the sets of differential signal pairs, each set forming one of the physical links 32a to 32d, via a common connector.

The SAS controllers 31a and 31b may be connected to each other using a narrow-port or wide-port configuration. In the narrow-port configuration, communication takes places using one physical link for a single port. In the wide-port configuration, communication takes places using more than one physical link for a single port. In the wide-port configuration, up to eight physical links can be collectively used as a single logical communication port. For example, the SAS 2.0 standard specifies the transmission rate up to 6 gigabits per second (Gbps) for each physical link, and the use of a wide-port configuration provides communication up to 48 Gbps.

The crossbar 351a distributes the data to be transmitted via a SAS cable to the transmission/reception units 310a to 310d under the control of the control circuit 352a. Further, the crossbar 351a receives data received via a SAS cable from the transmission/reception units 310a to 310d. The control circuit 352a controls various operations performed in the SAS controller 31a, such as the distribution of transmission data at the crossbar 351a. The control circuit 352a also controls which of the narrow-port configuration or the wide-port configuration to use for connection and how many physical links to use for a wide port.

Also, the crossbar 351b distributes the data to be transmitted via a SAS cable to the transmission/reception units 310e to 310h under the control of the control circuit 352b.

Further, the crossbar 351b receives data received via a SAS cable from the transmission/reception units 310e to 310h. The control circuit 352b controls various operations performed in the SAS controller 31b, such as the distribution of transmission data at the crossbar 351b. The control circuit 352b also controls which of the narrow-port configuration or the wide-port configuration to use for connection and how many physical links to use for a wide port.

It is assumed here that, for example, the SAS controller 31a is mounted in the CM 300a. For example, it is assumed that the SAS controller 31a is mounted in the IOC 305a. In this case, the control circuit 352a of the SAS controller 31a is capable of communicating with the CPU 301a of the CM 300a.

The transmission/reception units 310a to 310d perform training, when initiating connection through the respective physical links 32a to 32d, for the optimization of communication settings between the transmission/reception units 310a to 310d and their counterpart transmission/reception units. The sequence of the training includes a negotiation sequence for negotiating with the receive side to optimize a setting value of a transmit-side equalizer. The control circuit 352a is capable of, for example, in accordance with instructions from the CPU 301a, setting an initial setting value of the transmit-side equalizer for a negotiation for each of the transmission/reception units 310a to 310d and disconnecting connection or changing the settings of the transmit-side equalizer after the negotiation has been completed. The control circuit 352a is also capable of notifying the CPU 301a of the setting value of the transmit-side equalizer which has been determined by each of the transmission/reception units 310a to 310d through the negotiation.

Figure 6:
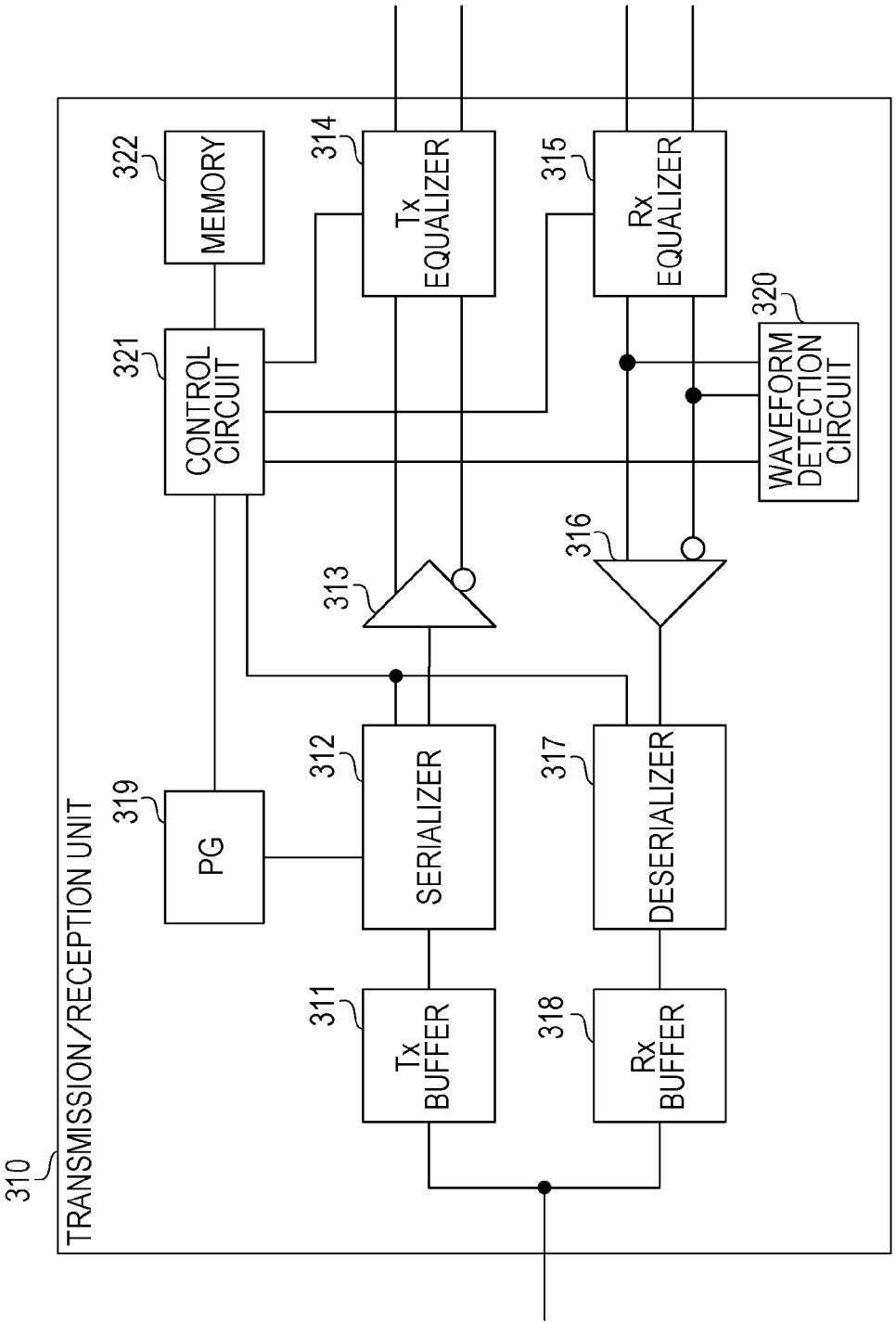
FIG. 6 is a diagram illustrating an example hardware configuration of a transmission/reception unit in a SAS controller.

FIG. 6 is a diagram illustrating an example hardware configuration of a transmission/reception unit in a SAS controller. The transmission/reception units 310a to 310h have similar hardware configurations, and are collectively referred to as a "transmission/reception unit 310" in FIG. 6. In the following description, the transmission/reception units 310a to 310h are each referred to as the "transmission/reception unit 310" without any distinction therebetween.

The transmission/reception unit 310 includes a Tx buffer 311, a serializer 312, a Tx driver 313, a Tx equalizer 314, an Rx equalizer 315, an Rx driver 316, a deserializer 317, an Rx buffer 318, a pulse generator (PG) 319, a waveform detection circuit 320, a control circuit 321, and a memory 322.

The Tx buffer 311 temporarily stores transmission data input from the crossbar in the same SAS controller (for example, from the crossbar 351a in FIG. 5), and outputs the stored transmission data to the serializer 312. The serializer 312 converts the transmission data input from the Tx buffer 311 from parallel data to serial data which is then output. The serializer 312 can also output a test signal for negotiation which is input from the pulse generator 319 to the Tx driver 313. The Tx driver 313 converts the transmission data or test signal input from the serializer 312 into a differential signal which is then output.

The Tx equalizer 314 shapes the waveform of the differential signal input from the Tx driver 313, and outputs the waveform-shaped differential signal to the corresponding one of the physical links 32a to 32d via a connector (not illustrated). Examples of the waveform shaping performed by the Tx equalizer 314 include pre-emphasis adjustment and pre-shoot adjustment. Pre-emphasis adjustment is a technique for increasing the signal level of a transmission signal at the time of the transition of the transmission signal from a low level to a high level. Pre-shoot adjustment is a technique for increasing the signal level of a transmission signal immediately before the transition of the transmission signal from a low level to a high level. The amounts of pre-emphasis and pre-shoot adjustments to be performed by the Tx equalizer 314 are specified by the control circuit 321.

The Rx equalizer 315 shapes the waveform of a differential signal input from the corresponding one of the physical links 32a to 32d via a connector (not illustrated), and outputs the waveform-shaped differential signal to the Rx driver 316. A waveform generation technique such as decision feedback equalization (DFE) or feed-forward equalization (FFE) may be used. The Rx equalizer 315 automatically adjusts its internal setting parameter during the training. The Rx equalizer 315 can output the automatically adjusted setting parameter to the control circuit in the same SAS controller (for example, to the control circuit 352a) via the control circuit 321.

The Rx driver 316 converts the differential signal output from the Rx equalizer 315 into a serial signal in a predetermined format, and outputs the serial signal to the deserializer 317. The deserializer 317 converts the serial signal input from the Rx driver 316 into a parallel signal, and outputs the parallel signal to the Rx buffer 318. The Rx buffer 318 temporarily stores the parallel signal output from the deserializer 317, and then outputs the parallel signal to the crossbar in the same SAS controller (for example, to the crossbar 351a in FIG. 5).

During the execution of the negotiation sequence where the transmission/reception unit 310 is on the transmit side, the pulse generator 319 supplies a test signal for negotiation to the serializer 312 in accordance with an instruction from the control circuit 321.

During the execution of the negotiation sequence where the transmission/reception unit 310 is on the receive side, the waveform detection circuit 320 detects the waveform of a test signal output from the Rx equalizer 315, and notifies the control circuit 321 of information indicating the state of the waveform. Examples of the information indicating the state of the waveform include information indicating an opening of an eye pattern.

The control circuit 321 controls various kinds of processes performed in the transmission/reception unit 310. For example, the control circuit 321 performs the following control during the execution of the negotiation sequence where the transmission/reception unit 310 is on the transmit side. The control circuit 321 sets an initial value of a parameter in the Tx equalizer 314 in accordance with an instruction from the control circuit in the same SAS controller (for example, from the control circuit 352a). Then, the control circuit 321 causes the pulse generator 319 to output a test signal for negotiation. In this case, the control circuit 321 causes the pulse generator 319 to transmit the test signal to the serializer 312 after predetermined additional information has been added to the test signal. When a parameter adjustment request message is returned from a counterpart transmission/reception unit connected to the transmission/reception unit 310, the control circuit 321 receives the parameter adjustment request message through the deserializer 317, and changes the value of the parameter to be set in the Tx equalizer 314 in accordance with the parameter adjustment request message. When a negotiation termination message is returned from the counterpart transmission/reception unit, the control circuit 321 receives the negotiation termination message through the deserializer 317. In this case, the control circuit 321 can notify the control circuit in the same SAS controller of the value of the parameter which has been finally set in the Tx equalizer 314.

The notified value of the parameter is provided to the CPU of the CM in which the SAS controller is mounted.

Further, the control circuit 321 performs the following control during the execution of the negotiation sequence where the transmission/reception unit 310 is on the receive side. When a test signal for negotiation is transmitted from the counterpart transmission/reception unit, the control circuit 321 receives information indicating the state of the waveform from the waveform detection circuit 320, and judges whether the received information satisfies a predetermined reference value. If the received information does not satisfy the reference value, the control circuit 321 causes the serializer 312 to transmit a parameter adjustment request message for increasing or decreasing a value of a parameter of a Tx equalizer in the counterpart transmission/reception unit in accordance with the difference between the received information and the reference value. If the received information satisfies the reference value, the control circuit 321 causes the serializer 312 to transmit a negotiation termination request message.

The memory 322 stores various kinds of data to be used for the processes of the control circuit 321.

Figure 7:
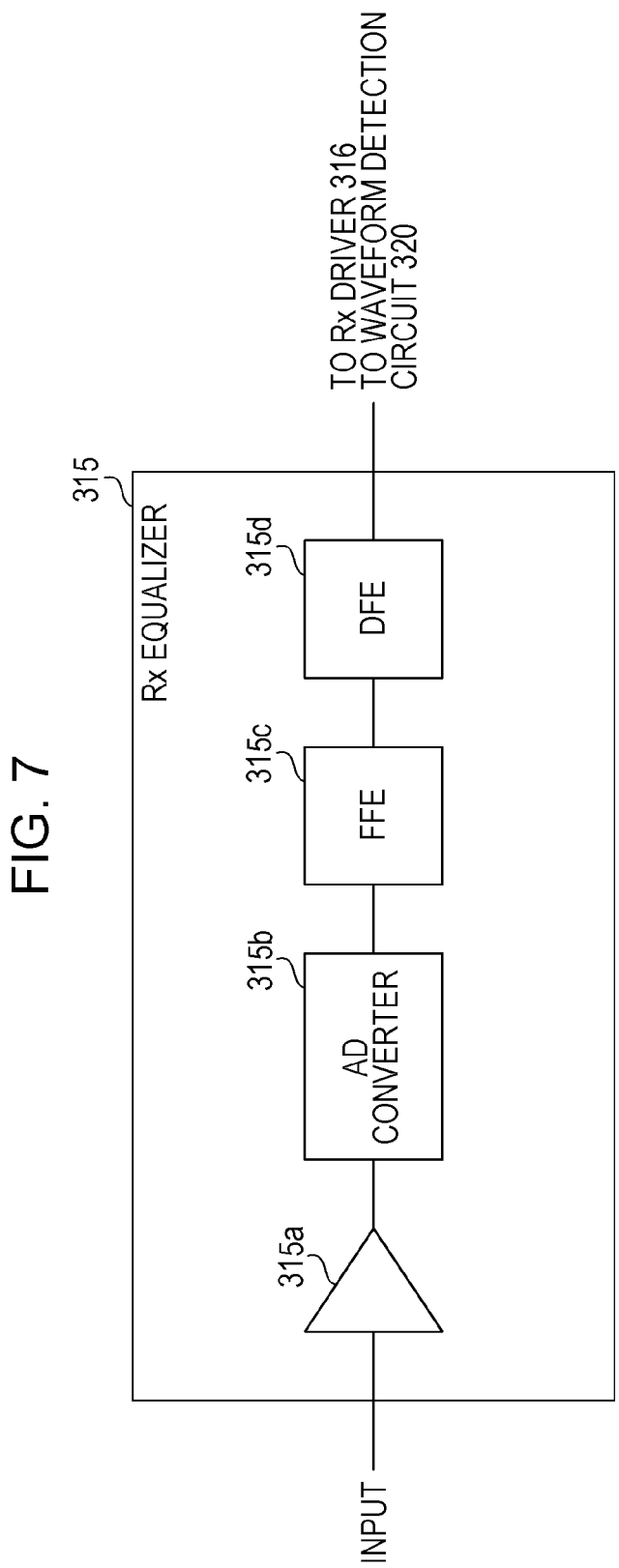
FIG. 7 is a diagram illustrating an example internal configuration of an Rx equalizer.

FIG. 7 is a diagram illustrating an example internal configuration of the Rx equalizer 315. The Rx equalizer 315 includes, for example, a gain adjustment unit 315a, an analog-to-digital (AD) converter 315b, an FFE 315c, and a DFE 315d.

The gain adjustment unit 315a adjusts the level of a differential signal input from the corresponding one of the physical links 32a to 32d via the connector (not illustrated). The AD converter 315b converts the differential signal (analog electrical signal) into a digital electrical signal. The FFE 315c superimposes a signal obtained by delaying the input signal and multiplying the delayed signal by a coefficient onto the input signal to shape the waveform. The DFE 315d superimposes a signal obtained by delaying an output signal and multiplying the delayed signal by a coefficient onto the input signal to shape the waveform.

Various parameters adjusted by the Rx equalizer 315 during the training are set in the Rx equalizer 315. For example, in the gain adjustment unit 315a, ADC_MAP_SCALE is set by the AD converter 315b and DP_FFE_M is set by the FFE 315c. Setting ADC_MAP_SCALE and DP_FFE_M so that the output level of the DFE 315d falls within a predetermined range adjusts the gain of the gain adjustment unit 315a. Furthermore, DP_FFE_B is set in the FFE 315c, and a DFE coefficient in the range of 0 to 4 is set in the DFE 315d. The FFE 315c adjusts DP_FFE_B so that its internal detection value falls within a predetermined range. The DFE 315d adjusts a DFE coefficient in the range of 0 to 4 so that its internal detection value falls within a predetermined range.

In the following description, a parameter to be set in the Rx equalizer 315, such as the parameters described above, may be represented by an "Rx parameter". A parameter to be set in the Tx equalizer 314 may be represented by a "Tx parameter".

Next, the negotiation sequence included in the training sequence when a connection is initiated between SAS controllers will be described. The following description will be given of a negotiation sequence between the SAS expander 306a of the CM 300a and the SAS expander 211a of the DE 210, by way of example. That is, in the following description, the SAS controller 31a represents a SAS controller mounted in the SAS expander 306a on its side near the DE 210, and the SAS controller 31b represents a SAS controller mounted in the SAS expander 211a on its side near the CM 300a. In the following description, furthermore, an operation of the SAS expander 306a of the CM 300a for setting a Tx parameter of the Tx equalizer 314 will be described, for simplicity of description.

Figure 8:
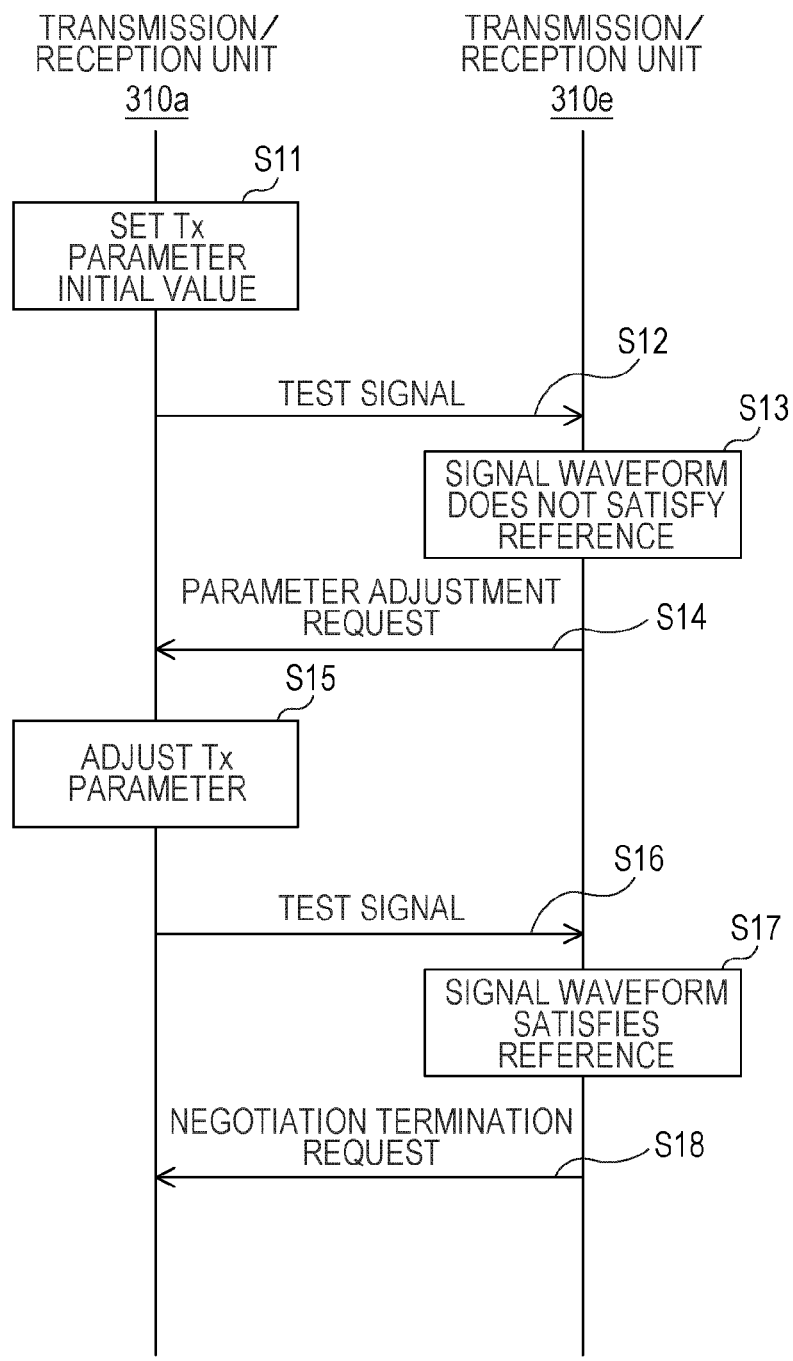
FIG. 8 is a diagram illustrating an example sequence of a negotiation.

FIG. 8 is a diagram illustrating an example sequence of a negotiation. The illustrated sequence is executed for each physical link when a negotiation is performed. In FIG. 8, a description will be made of an example of a sequence for setting a Tx parameter of the Tx equalizer 314 in the transmission/reception unit 310a for the physical link 32a between the transmission/reception unit 310a and the transmission/reception unit 310e through a negotiation. In the following, the process illustrated in FIG. 8 will be described in accordance with step numbers.

Step S11: In the transmission/reception unit 310a, the control circuit 321 sets an initial value of the Tx parameter of the Tx equalizer 314. The initial value is set by, for example, the recording of a value of the Tx parameter on a register of the Tx equalizer 314. An initial value of the Tx parameter has been stored in the memory 322. If no specific designation is given by the CPU 301a, a fixed value stored in advance in the memory 322 is used as an initial value of the Tx parameter.

Step S12: In the transmission/reception unit 310a, the control circuit 321 causes the pulse generator 319 to output a test signal for negotiation. In this case, the control circuit 321 causes the serializer 312 to transmit the test signal after predetermined additional information has been added to the test signal. Through the process of step S12, the test signal is transmitted to the transmission/reception unit 310e via the physical link 32a.

Step S13: In the transmission/reception unit 310e, the Rx equalizer 315 adjusts the Rx parameters described above, by way of example, with reference to FIG. 7 to adjust the waveform of the received test signal. More specifically, first, the Rx equalizer 315 sets, as each of the Rx parameters, an initial value stored in the memory 322. Then, the Rx equalizer 315 adjusts the waveform of the test signal while changing the setting value of each of the Rx parameters.

The waveform detection circuit 320 detects the adjusted waveform of the test signal, and outputs a detection value indicating the state of the waveform to the control circuit 321. The control circuit 321 judges whether the input detection value satisfies a predetermined reference. It is assumed here that it is judged that the detection value indicating the state of the waveform does not satisfy the predetermined reference.

Step S14: In the transmission/reception unit 310e, the control circuit 321 transmits a parameter adjustment request to the transmission/reception unit 310a. The parameter adjustment request is a message for requesting the adjustment of a Tx parameter for transmission which is set for the physical link 32a. There are a plurality of types of message codes to indicate a parameter adjustment request, and a type of Tx parameter to be adjusted, an adjustment value of the Tx parameter, and the like differ depending on the message code. A message code of the parameter adjustment request is determined based on a difference between a detection value indicating the state of the waveform and the reference by the control circuit 321 of the transmission/reception unit 310e.

Step S15: In the transmission/reception unit 310a, the control circuit 321 receives the message code of the parameter adjustment request via the deserializer 317. The control circuit 321 changes the setting value of the Tx parameter in the Tx equalizer 314 in accordance with the received message code.

Step S16: A test signal is transmitted from the transmission/reception unit 310a to the transmission/reception unit 310e using a procedure similar to that in step S12.

Step S17: In the transmission/reception unit 310e, the Rx equalizer 315 adjusts each Rx parameter to adjust the waveform of the received test signal. The waveform detection circuit 320 detects the waveform of the test signal, and outputs a detection value indicating the state of the waveform to the control circuit 321. The control circuit 321 judges whether the input detection value satisfies a predetermined reference. It is assumed here that it is judged that the detection value indicating the state of the waveform satisfies the predetermined reference.

Step S18: In the transmission/reception unit 310e, the control circuit 321 transmits a negotiation termination request to the transmission/reception unit 310a. The negotiation termination request is a message for requesting the source device to terminate the negotiation since the detection value indicating the waveform of the test signal for negotiation satisfies the predetermined reference.

Through the processes described above, an optimal value of the Tx parameter of the Tx equalizer 314 for the physical link 32a is determined. The automatic adjustment function of the Rx equalizer 315 allows an optimal value of the Rx parameter of the Rx equalizer 315 to be also determined.

In the example illustrated in FIG. 8, a detection value of a test signal waveform satisfies the reference only through one-time adjustment of a Tx parameter in a negotiation between the transmission/reception units 310a and 310e. In actuality, however, the adjustment of a Tx parameter is generally performed a plurality of times (for example, five to ten times) until a detection value of a test signal waveform satisfies the reference.

FIG. 9 is a diagram illustrating an example of a message list. A message list 331 is a list of messages received from the SAS controller of the data destination device during a negotiation. The message list 331 may be stored in, for example, the memory 322 and may be referred to by the control circuit 321. The message list 331 has a "message code" field, a "parameter C1" field, a "parameter C2" field, and a "parameter C3" field.

In the "message code" field, values (message codes) indicating the types of messages received from the SAS controller of the data destination device during a negotiation are set. "C1", "C2", and "C3" represent the types of Tx parameters to be set in the Tx equalizer 314.

In the "parameter C1" field, information indicating the details of the adjustment for the parameter C1 is set. For example, "±0" refers to a request not to increase or decrease the parameter C1. Further, "+1" refers to a request to increase the parameter C1 by "1", and "+2" refers to a request to increase the parameter C1 by "2". Further, "−1" refers to a request to decrease the parameter C1 by "1", and "−2" refers to a request to decrease the parameter C1 by "2". Likewise, in the "parameter C2" field, information indicating the details of the adjustment for the parameter C2 is set, and, in the "parameter C3" field, information indicating the details of the adjustment for the parameter C3 is set.

For example, the message code "0Ah" indicates a request not to increase or decrease the parameter C1, to decrease the parameter C2 by "2", and to decrease the parameter C3 by "2". The message code "00h" indicates that none of the parameters C1 to C3 needs to be increased or decreased. The message code "00h" is used as a negotiation termination request.

Here, the parameter C1 indicates a value for pre-shoot adjustment in the Tx equalizer 314. Pre-shoot adjustment is a technique for increasing the signal level of a transmission signal immediately before the transition of the transmission signal from a low level to a high level. The parameter C2 indicates a value for the adjustment of a transmission signal level in the Tx equalizer 314. The parameter C3 indicates a value for pre-emphasis adjustment in the Tx equalizer 314. Pre-emphasis adjustment is a technique for increasing the signal level of a transmission signal at the time of the transition of the transmission signal from a low level to a high level.

Figure 10:
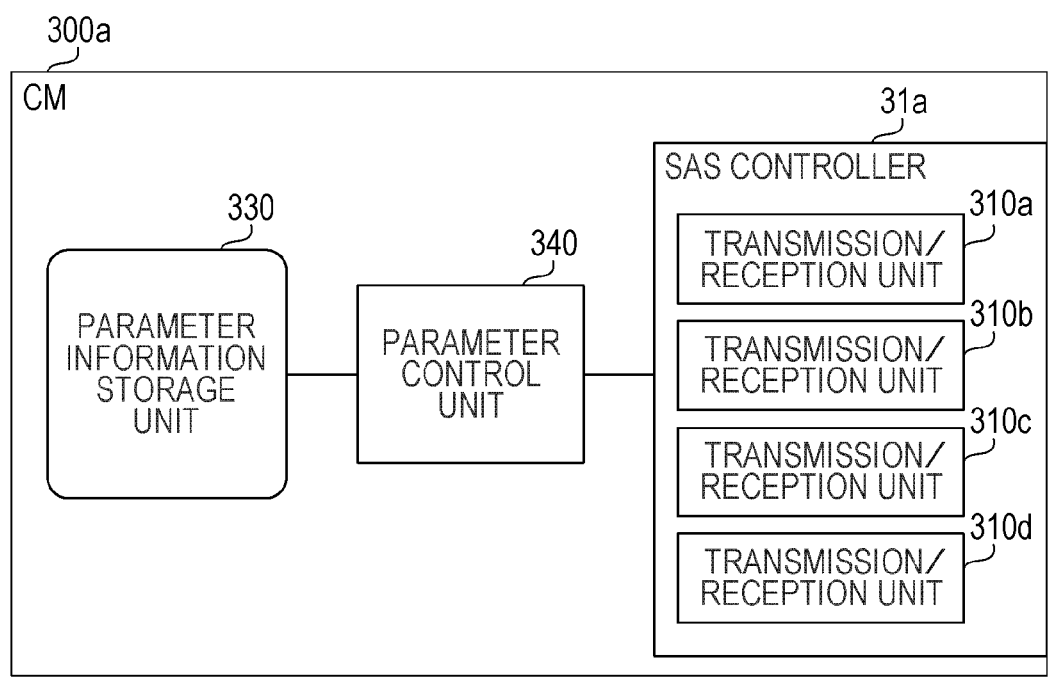
FIG. 10 is a block diagram illustrating example functions of a CM according to the second embodiment.

FIG. 10 is a block diagram illustrating example functions of a CM according to the second embodiment. In FIG. 10, the description will be made of the CM 300a. The CM 300b also has functions similar to those of the CM 300a. The CM 300a includes a parameter information storage unit 330 and a parameter control unit 340. As described above, the CM 300a is configured to also include the SAS controller 31a.

The parameter control unit 340 is an example of the judgment unit 13 according to the first embodiment, and the SAS controller 31a is an example of the interface unit 11 and the setting unit 12 according to the first embodiment. More specifically, the Tx equalizer 314 of each of the transmission/reception units 310a to 310d is an example of the interface unit 11, and the control circuit 321 of each of the transmission/reception units 310a to 310d is an example of the setting unit 12 (see FIG. 6).

The parameter information storage unit 330 is implemented as a storage area reserved in the RAM 302a or the SSD 308a included in the CM 300a. The processes of the parameter control unit 340 are implemented by, for example, the CPU 301a included in the CM 300a executing a predetermined program.

The parameter information storage unit 330 stores a Tx parameter table that contains values of a Tx parameter which are set in the respective Tx equalizers 314 of the transmission/reception units 310a to 310d. The parameter information storage unit 330 further stores an Rx parameter table that contains values of an Rx parameter which are set in the respective Rx equalizers 315 of the transmission/reception units 310a to 310d.

The parameter control unit 340 requests the transmission/reception units 310a to 310d in the SAS controller 31a to negotiate with the SAS controller 31b at the destination to determine values of the Tx parameter for the respective Tx equalizers 314 of the transmission/reception units 310a to 310d. In this case, the parameter control unit 340 specifies different initial values of the Tx parameter for the transmission/reception units 310a to 310d.

When the negotiation is completed, the parameter control unit 340 receives the values of the Tx parameter determined through the negotiation from the transmission/reception units 310a to 310d. The parameter control unit 340 identifies a Tx parameter allowable range on the basis of the values of the Tx parameter received from the transmission/reception units 310a to 310d. The Tx parameter allowable range is a range of values of the Tx parameter which are judged for the transmission/reception units 310a to 310d to be appropriate. The Tx parameter allowable range can be identified in accordance with the distribution of the values of the Tx parameter which are determined for the transmission/reception units 310a to 310d. The Tx parameter allowable range is hereinafter referred to as the "Tx allowable range".

The parameter control unit 340 judges whether the values of the Tx parameter received from the transmission/reception units 310a to 310d fall within the identified Tx allowable range. If there is any value of the Tx parameter that does not fall within the Tx allowable range, the parameter control unit 340 requests the transmission/reception unit that has transmitted the value of the Tx parameter to perform a renegotiation. If the parameter control unit 340 has failed to identify a Tx allowable range (if there is no area having a predetermined size in which the distribution of the values of the Tx parameter is concentrated to some extent), the parameter control unit 340 requests all the transmission/reception units 310a to 310d to perform a renegotiation.

The parameter control unit 340 again identifies a Tx allowable range based on the value or values of the Tx parameter determined through the renegotiation and the values of the Tx parameter already determined to fall within the Tx allowable range. Then, the parameter control unit 340 judges whether each of the values of the Tx parameter falls within the identified Tx allowable range to judge the appropriateness of each of the values of the Tx parameter.

Further, the parameter control unit 340 receives, from the transmission/reception units 310e to 310h in the SAS controller 31b at the destination, the values of each of the Rx parameters which have been set in the respective Rx equalizers 315 mounted in the transmission/reception units 310e to 310h at the time when the negotiation is completed. The values of the Rx parameter are values automatically adjusted by the Rx equalizer 315 at the destination. The parameter control unit 340 identifies an Rx parameter allowable range based on the values of the Rx parameter received from the transmission/reception units 310e to 310h. The Rx parameter allowable range is hereinafter referred to as the "Rx allowable range".

The parameter control unit 340 judges whether the values of the Rx parameter which are set in the respective Rx equalizers 315 of the transmission/reception units 310e to 310h fall within the Rx allowable range. If there is any value of the Rx parameter that does not fall within the Rx allowable range, the parameter control unit 340 requests the transmission/reception unit that has received the value of the Rx parameter to perform a renegotiation.

Communication between the parameter control unit 340 and each of the transmission/reception units 310a to 310d is actually performed via the control circuit 352a of the SAS controller 31a.

FIG. 11 is a diagram illustrating an example of a Tx parameter table. A Tx parameter table 332 is stored in the parameter information storage unit 330. The Tx parameter table 332 contains information indicating values of a Tx parameter which are set in the respective Tx equalizers 314 of the transmission/reception units 310a to 310d.

The Tx parameter table 332 has a "wide port ID (Identification)" field, a "physical link ID" field, a "parameter type" field, and a "setting value" field. In the "wide port ID" field, an identifier for identifying a wide port is registered. In the "physical link ID" field, identifiers for identifying physical links making up the wide port are registered.

In the "parameter type" field, information indicating types of Tx parameters to be set for the physical links for transmission is registered. As described above, the types of the Tx parameters include C1 to C3. In the "setting value" field, values of a Tx parameter set for a corresponding parameter type are registered.

The Rx parameter table has the same fields as those in the Tx parameter table 332, and is not described herein. In the "parameter type" field in the Rx parameter table, types of Rx parameters are registered.

Figure 12:
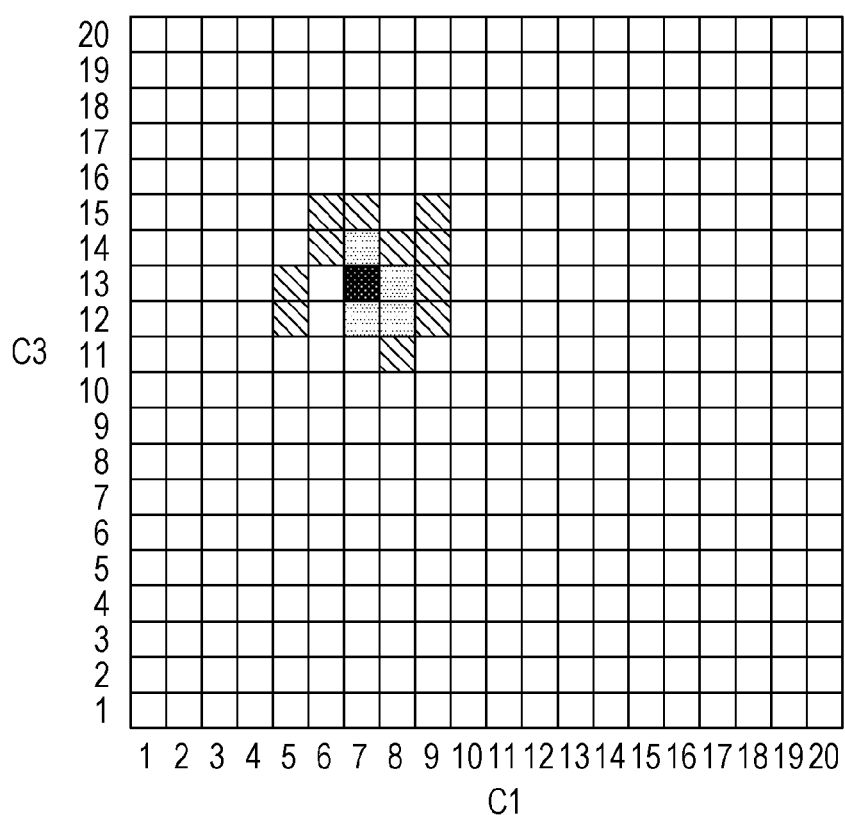
FIG. 12 is a diagram illustrating an example of variations in the setting of a Tx parameter group.
Figure 13:
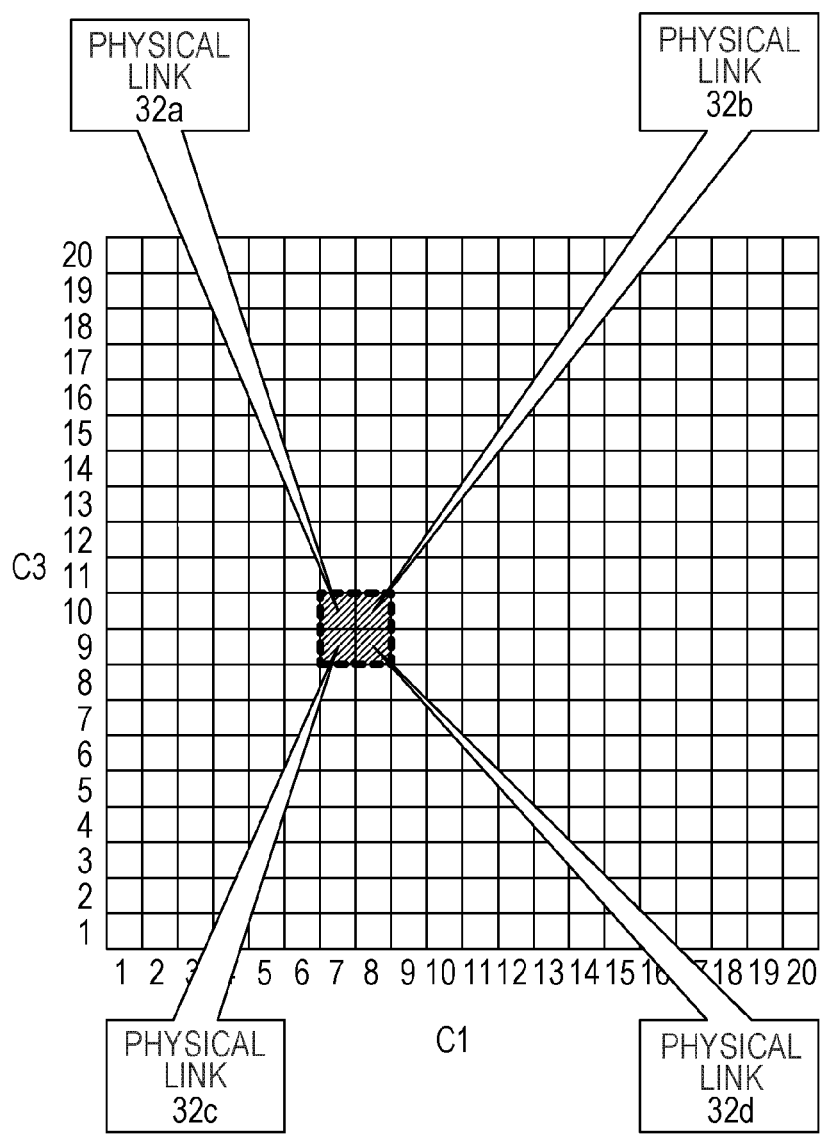
FIG. 13 is a diagram illustrating an example of a Tx parameter group whose values are appropriate.
Figure 14:
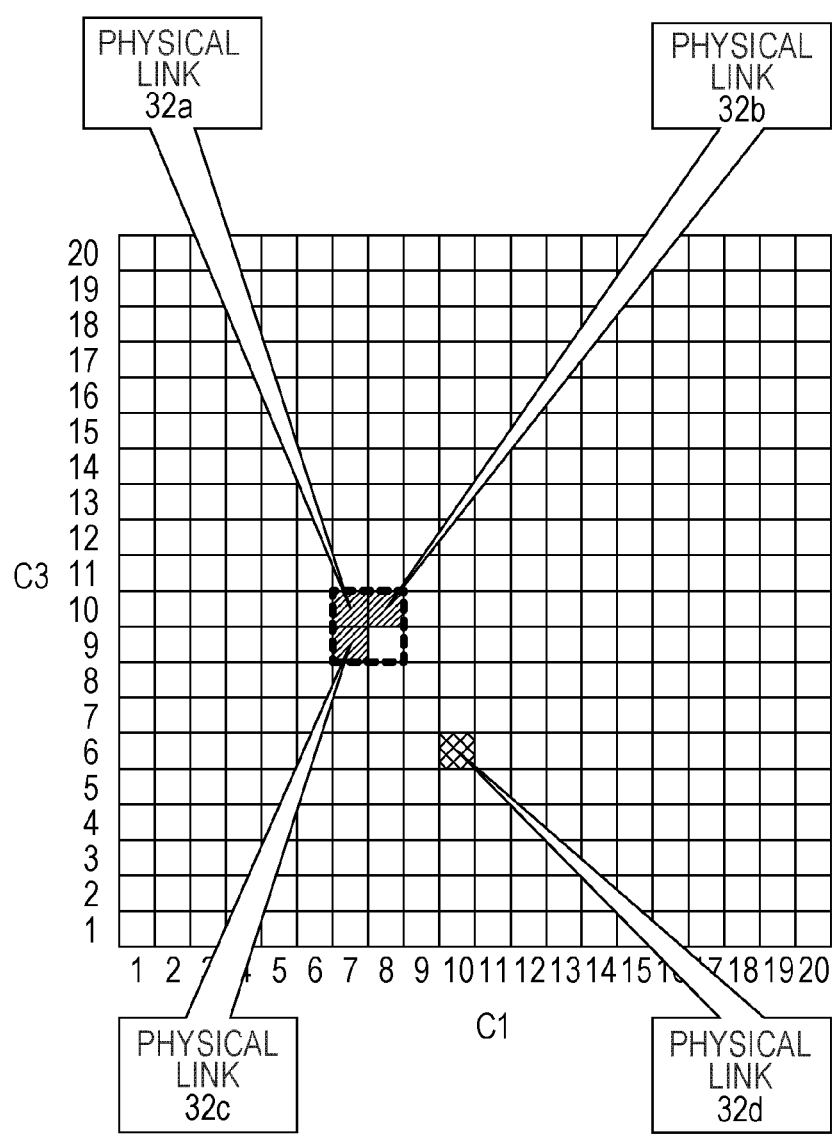
FIG. 14 is a diagram illustrating an example of a Tx parameter group whose values include an inappropriate value.

Next, an example of judgment for a Tx parameter determined by a negotiation will be described with reference to FIGS. 12 to 14. Here, first, issues experienced when a value of a Tx parameter is determined by a negotiation will be described with reference to FIG. 12, and then a process for judging the appropriateness of the value of the Tx parameter determined by the negotiation will be described with reference to FIGS. 13 and 14. In FIGS. 12 to 14, for simplicity of illustration, a combination of the parameters C1 and C3 is referred to as a "Tx parameter group", and a process for determining values of the Tx parameter group will be described. In the following, a pair of setting values of a Tx parameter group including the parameter C1 and the parameter C3 may be represented as (the parameter C1, the parameter C3).

FIG. 12 is a diagram illustrating an example of variations in the setting of the Tx parameter group. FIG. 12 illustrates the distribution of value pairs of the Tx parameter group which have been previously determined by a negotiation for each of the physical links making up a wide port. The vertical axis represents the parameter C3 and the horizontal axis represents the parameter C1.

In FIG. 12, (7, 12), (7, 13), (7, 14), (8, 12), and (8, 13) represent value pairs of the Tx parameter group which have been previously set for all the physical links by a negotiation. Among the value pairs, the value pair (7, 13) is assumed to be optimum values of the Tx parameter group which are set for a physical link. Further, the value pairs (5, 12), (5, 13), (6, 14), (6, 15), (7, 15), (8, 11), (8, 14), (9, 12), (9, 13), (9, 14), and (9, 15) are values of the Tx parameter group which have been previously set for some of the physical links by a negotiation.

As illustrated in FIG. 12, the value pairs of the Tx parameter group determined by a negotiation may vary for each negotiation and for each physical link. The variations in the value pairs of the Tx parameter group may be caused by the method of evaluation of a test signal on the receive side. The processing procedure for the evaluation of a test signal, which is executed by a commercially available SAS interface, is not determined considering every condition, and is typically determined considering comparatively restrictive conditions. For this reason, if the actual conditions do not match the considered conditions, an appropriate evaluation of a test signal may not be achievable.

Examples of the considered conditions include the length of a transmission path. If communication takes place between different devices such as between the CM 300a and the DE 210 or between the CM 300a and the CM 300b, the transmission path may be longer than expected during the development and design of the communication interfaces. In this case, even if it is judged on the receive side that the waveform of the received test signal is appropriate as a result of evaluation, it may be difficult to determine whether a value of a Tx parameter that has been set on the transmit side at this time is completely appropriate. Communication with the value of the Tx parameter being set may cause a communication failure even though the value of the Tx parameter has been judged to be appropriate in a negotiation. The same applies to the specifications, other than the length, of the transmission path.

Further, a difference in vendor between a transmit-side SAS interface and a receive-side SAS interface may also cause any appropriate value of a Tx parameter which has been determined by a negotiation to be incorrect. Also, malfunctioning of a device in a SAS interface or emergence of a characteristic anomaly in a transmission path on a substrate may cause any appropriate value of a Tx parameter which has been determined by a negotiation to be incorrect.

In contrast, physical links making up a wide port have substantially common specifications and characteristics regarding transmission paths for the following reasons. The lengths of transmission paths for such physical links are substantially identical. In addition, the physical links are processed by a common interface circuit and are connected via a common connector. This may result in malfunctioning of a transmission path or a characteristic anomaly being less likely to occur only for a specific physical link.

For the reasons described above, optimal values of a Tx parameter of the Tx equalizer 314 are likely to be close across physical links. Accordingly, the parameter control unit 340 judges the appropriateness of a value pair of the Tx parameter group for each physical link, which has been determined by a negotiation, in the following way.

First, the parameter control unit 340 identifies the position of a Tx allowable range having a certain size on the basis of a value pair of the Tx parameter group which has been determined for each physical link. As illustrated in FIG. 12, the distribution of the value pairs of the Tx parameter group which have been previously set for every physical link is concentrated in an area near the optimal value pair of the Tx parameter group. Accordingly, the parameter control unit 340 identifies an area having a predetermined size in which the distribution of the determined value pairs of the Tx parameter group is concentrated to some extent as a Tx allowable range that is a range of error with respect to the optimal value pair of the Tx parameter group. The parameter control unit 340 judges a value pair of the Tx parameter group which does not fall within the Tx allowable range among the value pairs of the Tx parameter group which have been determined for a plurality of physical links is inappropriate.

FIG. 13 is a diagram illustrating an example of a Tx parameter group whose values are appropriate. FIG. 13 illustrates value pairs of a Tx parameter group including the parameter C1 and the parameter C3, the value pairs being determined for physical links making up a wide port by a negotiation. In FIG. 13, portions that are identical to those in FIG. 12 are not described herein.

In FIG. 13, a value pair (7, 10) of the Tx parameter group is assumed to have been determined for the physical link 32a. Further, a value pair (8, 10) of the Tx parameter group is assumed to have been determined for the physical link 32b. Further, a value pair (7, 9) of the Tx parameter group is assumed to have been determined for the physical link 32c. Further, a value pair (8, 9) of the Tx parameter group is assumed to have been determined for the physical link 32d.

Here, a description will be made of the case where the allowable maximum error for values of a Tx parameter (that is, the size of a Tx allowable range) is "2" for both the parameters C1 and C3, by way of example. The parameter control unit 340 extracts combinations of value pairs of the Tx parameter group for which a difference between a maximum value and a minimum value for each of the parameters C1 and C3 from among all the determined value pairs of the Tx parameter group is less than or equal to the maximum error. Then, the parameter control unit 340 selects a combination of value pairs of the Tx parameter group which include the largest values of the Tx parameter group from among the extracted combinations of value pairs of the Tx parameter group, and sets a Tx allowable range that includes the value pairs of the Tx parameter group which are included in the selected combination of value pairs of the Tx parameter group. If the number of value pairs of the Tx parameter group included in the selected combination of value pairs of the Tx parameter group is less than or equal to the majority of the total number of value pairs of the Tx parameter group, the parameter control unit 340 judges that the value pairs of the Tx parameter group are not concentrated (or are scattered), and disables the Tx allowable range.

As illustrated in FIG. 13, the distribution of the value pairs of the Tx parameter group determined for the physical links 32a to 32d is concentrated in the range of (7 to 8, 9 to 10). The size of the range is within the maximum error of "2" for both the parameters C1 and C3. The number of value pairs of the Tx parameter group that fall within the range is four, which is larger than the majority of the determined total number of value pairs of the Tx parameter group, namely, "2". Accordingly, the range of (7 to 8, 9 to 10) is identified as a Tx allowable range.

The value pairs of the Tx parameter group which are determined for the physical links 32a to 32d are each within the Tx allowable range, and are thus judged to be appropriate. Thus, the parameter control unit 340 judges that the setting of the Tx parameters for the physical links making up a wide port is successful, and then terminates the negotiation.

FIG. 14 is a diagram illustrating an example of a Tx parameter group whose values include an inappropriate value. FIG. 14 illustrates value pairs of a Tx parameter group including the parameter C1 and the parameter C3, the value pairs being determined for physical links making up a wide port by a negotiation. In FIG. 14, portions that are identical to those in FIG. 13 are not described herein. In FIG. 14, a value pair (10, 6) of the Tx parameter group is determined for the physical link 32d by a negotiation.

In this case, as illustrated in FIG. 14, the distribution of the value pairs of the Tx parameter group determined for the physical links 32a to 32c is concentrated in the range of (7 to 8, 9 to 10). The number of value pairs of the Tx parameter group that fall within the range is three, which is larger than the majority of the determined total number of value pairs of the Tx parameter group, namely, "2". Accordingly, the range of (7 to 8, 9 to 10) is identified as a Tx allowable range.

As illustrated in FIG. 14, the value pairs of the Tx parameter group determined for the physical links 32a to 32c are each within the Tx allowable range, and are thus judged to be appropriate. In contrast, the value pair of the Tx parameter group determined for the physical link 32d is outside the Tx allowable range, and is thus judged to be inappropriate. For the physical link 32d, therefore, a renegotiation with the SAS interface at the destination is performed in accordance with, for example, an instruction of the parameter control unit 340.

As described above with reference to FIGS. 13 and 14, if the distribution of the value pairs of the Tx parameter group which are determined by a negotiation is concentrated in an area having a certain size, the parameter control unit 340 identifies the area as a Tx allowable range. Accordingly, an optimum range of error for the value pairs of the Tx parameter group (that is, an appropriate range for the Tx parameter group) can be estimated.

Furthermore, a value pair of the Tx parameter group which does not fall within the identified Tx allowable range is judged to be inappropriate. This provides accurate judgment of the appropriateness of the value pairs of the Tx parameter group which are determined by a negotiation.

Figure 15:
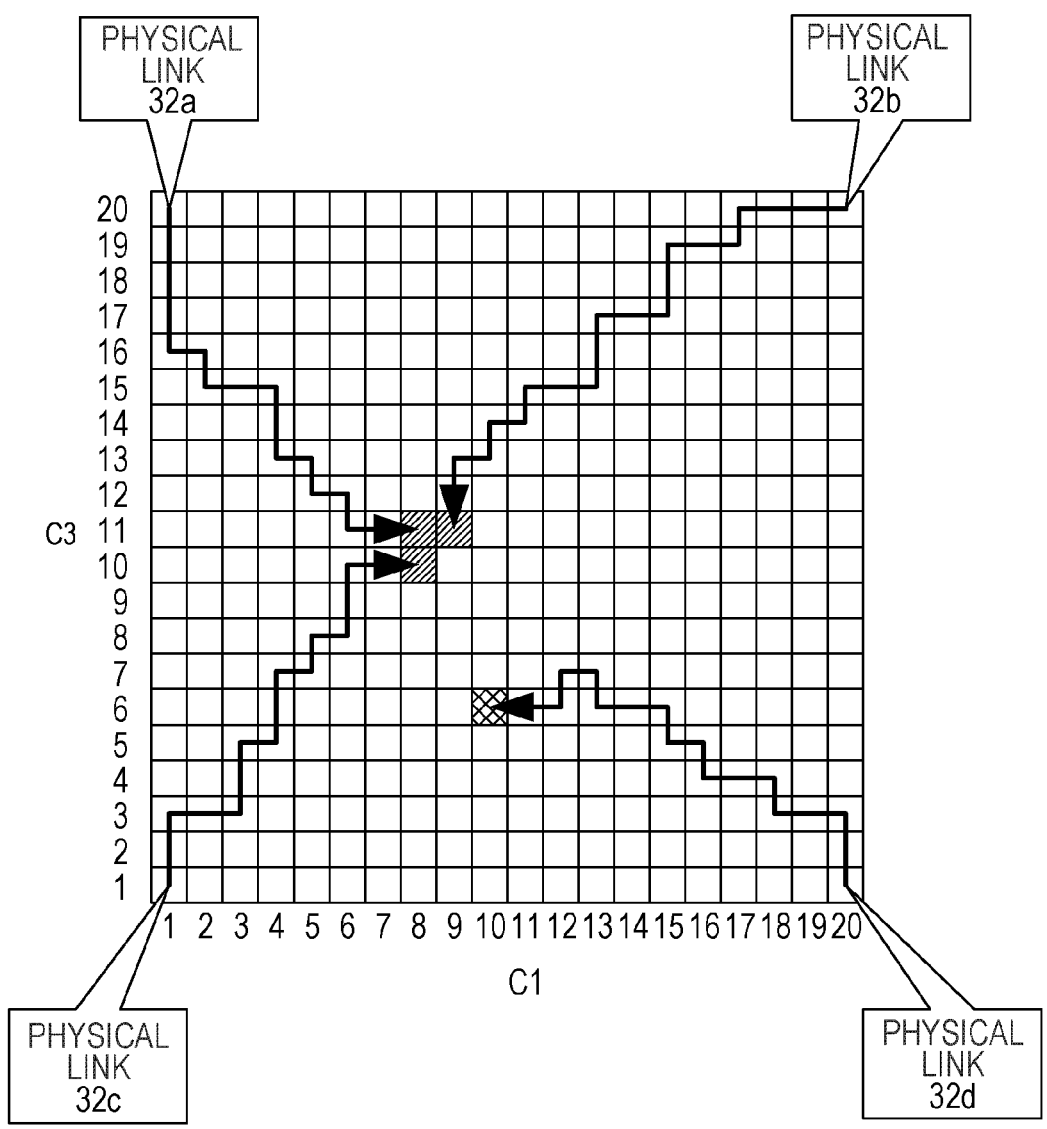
FIG. 15 is a diagram illustrating an example of the setting of initial Tx parameter groups.

FIG. 15 is a diagram illustrating an example of the setting of initial Tx parameter groups. The parameter control unit 340 sets a different initial Tx parameter group in the Tx equalizer 314 for each physical link when a negotiation is performed. The term "initial Tx parameter group", as used herein, refers to a set of initial values of Tx parameters to be set in the Tx equalizer 314 for a negotiation.

In FIG. 15, the arrows indicate the paths taken by the value pairs of the Tx parameter group for a period from the start of a negotiation for the physical links 32a to 32d to the end of the negotiation. In FIG. 15, the starting point of each arrow indicates an initial Tx parameter group which is set for the corresponding physical link, and the end point of each arrow indicates a value pair of the Tx parameter group which is determined for the corresponding physical link.

As illustrated in FIG. 15, an initial Tx parameter group (1, 20) is set for the physical link 32a, and an initial Tx parameter group (20, 20) is set for the physical link 32b. Further, an initial Tx parameter group (1, 1) is set for the physical link 32c, and an initial Tx parameter group (20, 1) is set for the physical link 32d.

Thereafter, a value pair of the Tx parameter group for the physical link 32a transitions in the order of (1, 16)→(2, 16)→(2, 15)→(4, 15)→(4, 13)→(5, 13)→(5, 12)→(6, 12)→(6, 11) through the negotiation, and then a value pair (8, 11) is determined.

Also, a value pair of the Tx parameter group for the physical link 32b transitions in the order of (17, 20)→(17, 19)→(15, 19)→(15, 17)→(13, 17)→(13, 15)→(11, 15)→(11, 14)→(10, 14)→(10, 13)→(9, 13) through the negotiation, and then a value pair (9, 11) is determined.

Also, a value pair of the Tx parameter group for the physical link 32c transitions in the order of (1, 3)→(3, 3)→(3, 5)→(4, 5)→(4, 7)→(5, 7)→(5, 8)→(6, 8)→(6, 10) through the negotiation, and then a value pair (8, 10) is determined.

Also, a value pair of the Tx parameter group for the physical link 32d transitions in the order of (20, 3)→(18, 3)→(18, 4)→(16, 4)→(16, 5)→(15, 5)→(15, 6)→(13, 6)→(13, 7)→(12, 7)→(12, 6) through the negotiation, and then a value pair (10, 6) is determined.

In this case, the range of (8 to 9, 10 to 11) is identified as a Tx allowable range in a way similar to that in FIG. 14. The value pair (10, 6), which is set for the physical link 32d, does not fall within the Tx allowable range, and is thus judged to be inappropriate.

A negotiation performed with the same initial Tx parameter group being set for the physical links 32a to 32d may provide similar patterns of transitions of the Tx parameter group, resulting in the same value pairs of the Tx parameter group being likely to be determined. Similar patterns of transitions of the Tx parameter group imply that a large number of value pairs of the Tx parameter group which do not undergo the examination of the waveform of the received test signal exist. In this case, even if the value pairs of the Tx parameter group which do not undergo the examination of the waveform of the received test signal include an optimal value pair of the Tx parameter group, such a value pair of the Tx parameter group is not determined to be optimal. For this reason, the method described above with reference to FIGS. 13 and 14 would be insufficient and may cause an area in which the distribution of inappropriate value pairs of the Tx parameter group is concentrated among the value pairs of the Tx parameter group determined for the respective physical links for transmission to be identified as a Tx allowable range.

For example, as illustrated in FIG. 15, it is assumed that the value pair (10, 6) is an inappropriate value pair of the Tx parameter group. In this case, performing a negotiation with the initial Tx parameter group (20, 1) being equally set for the other physical links 32a to 32c may result in it being probable that transitions of the Tx parameter group will occur in a pattern similar to that in a negotiation performed for the physical link 32d as illustrated in FIG. 15. In this case, the distribution of the value pairs of the Tx parameter group for the physical links 32a to 32d may be concentrated to the inappropriate value pair (10, 6) of the Tx parameter group. This results in the value pair (10, 6) being judged to be appropriate although it is actually inappropriate, which is not desirable.

Accordingly, the parameter control unit 340 causes a negotiation to be performed with different initial Tx parameter groups being set for the respective physical links. Thus, as illustrated in FIG. 15, transitions of the Tx parameter group occur in a different pattern for each physical link during the negotiation for the corresponding physical link. This allows the distribution of the value pairs of the Tx parameter group which are determined for the respective physical links to be less likely to be concentrated in an inappropriate area. This provides accurate judgment of the appropriateness of values of parameters which are determined by a negotiation.

While the Tx parameters of the Tx equalizer 314 have been described with reference to FIGS. 12 to 15, the same applies to the Rx parameters automatically adjusted in the Rx equalizer 315 of the SAS controller 31b at the destination. That is, similarly to the Tx parameters of the Tx equalizer 314, values of the Rx parameters of the Rx equalizer 315 may also vary for each negotiation and for each physical link due to factors such as the difference in transmission path length and the difference in vendor between the transmit-side SAS interface and the receive-side SAS interface.

Accordingly, the parameter control unit 340 on the transmit side performs a judgment process on the Rx parameters set in the SAS controller 31b at the destination in a way similar to that for the Tx parameters described above. That is, the parameter control unit 340 judges whether a set of values of an Rx parameter group for each physical link falls within an Rx allowable range having a certain size. If there is any set of values of the Rx parameter group that does not fall within the Rx allowable range, the parameter control unit 340 judges that the set of values of the Rx parameter group, which has been set, is inappropriate. Furthermore, the SAS controller 31b at the destination sets a different set of initial values of the Rx parameter group for each physical link to reduce the probability that the distribution of the sets of values of the Rx parameter group determined for the respective physical links will be concentrated in an inappropriate range.

Next, a process in which the CM 300a sets parameters of the Tx equalizer 314 will be described with reference to flowcharts illustrated in FIGS. 16 and 17.

Figure 16:
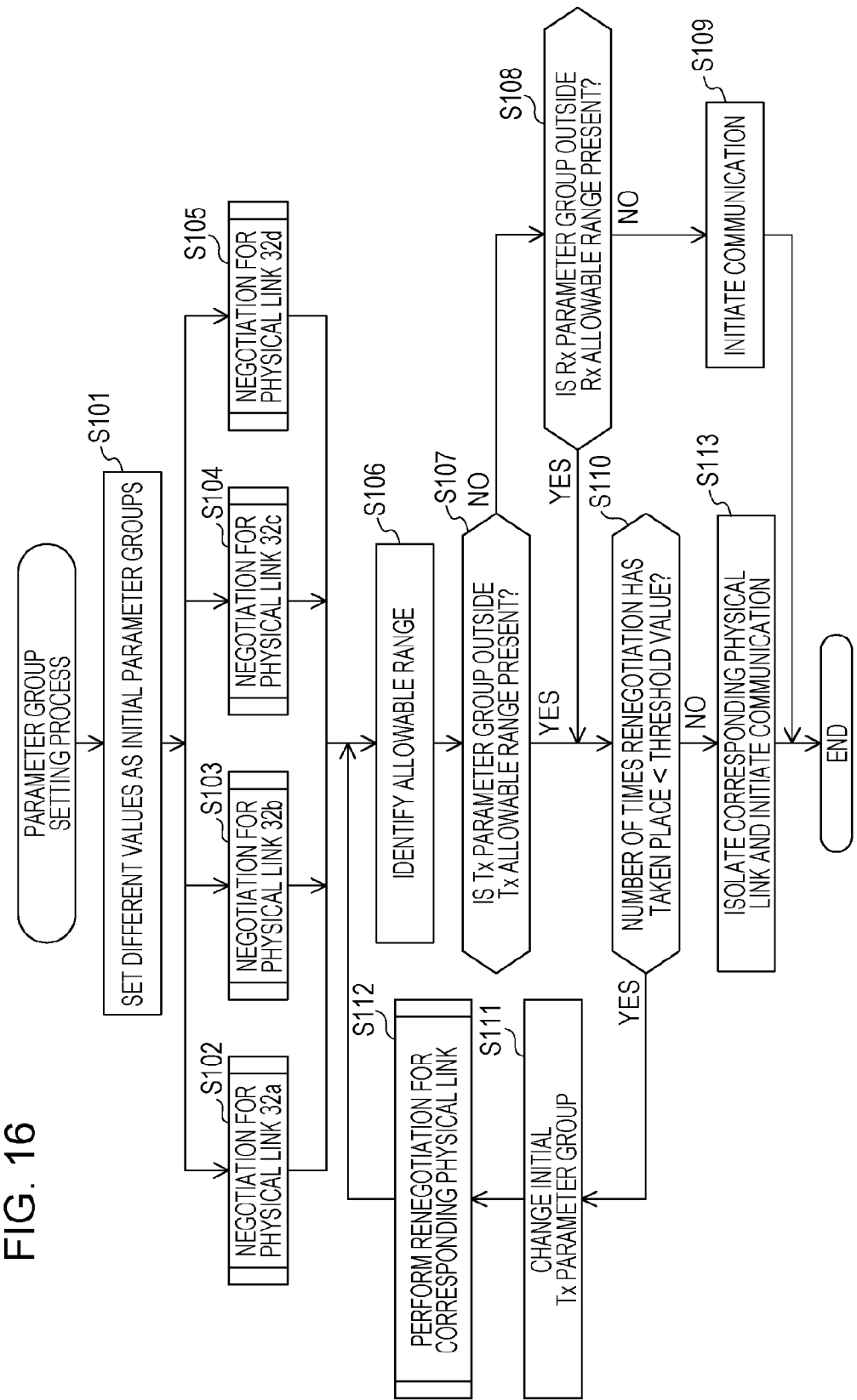
FIG. 16 is a flowchart illustrating an example of a process for setting a parameter group.

FIG. 16 is a flowchart illustrating an example of a process for setting a parameter group. In the following, the process illustrated in FIG. 16 will be described in accordance with step numbers.

Step S101: The parameter control unit 340 notifies each of the transmission/reception units 310a to 310d of a different initial Tx parameter group to set the initial Tx parameter group in the corresponding Tx equalizer 314. Then, the parameter control unit 340 requests each of the transmission/reception units 310a to 310d to perform a negotiation. In this case, different initial Rx parameter groups are also set in the transmission/reception units 310e to 310h of the SAS controller 31b at the destination. The term "initial Rx parameter group", as used herein, refers to a set of initial values of Rx parameters to be set in the Rx equalizer 315 for a negotiation. The setting of initial values of Rx parameters in the SAS controller 31b at the destination is under the control of, for example, the CPU of the destination device (for example, the CPU 213 of the DE 210).

Step S102: The transmission/reception unit 310*a* to be connected to the physical link 32*a* starts a negotiation for parameter setting for the Tx equalizer 314 in the state where the initial Tx parameter group notified in step S101 has been set in the Tx equalizer 314. The negotiation process will be described below in detail with reference to FIG. 17.

The parameter control unit 340 receives a set of values of the Tx parameter group which has been determined for the physical link 32*a* from the transmission/reception unit 310*a*. The parameter control unit 340 registers the set of values of the Tx parameter group received from the transmission/reception unit 310*a* to the "setting value" field associated with the corresponding wide port ID and the corresponding physical link ID in the Tx parameter table 332.

The parameter control unit 340 further receives, via the transmission/reception unit 310*a*, a set of values of the Rx parameter group which has been set in the Rx equalizer 315 of the transmission/reception unit 310*e* at the destination at the time when the negotiation is completed. The parameter control unit 340 registers the set of values of the Rx parameter group received from the transmission/reception unit 310*a* to the Rx parameter table. The set of values of the Rx parameter group is transmitted from the transmission/reception unit 310*e* in response to a parameter transmission request sent from the transmission/reception unit 310*a* to the transmission/reception unit 310*e* in accordance with, for example, an instruction of the parameter control unit 340.

Step S103: The transmission/reception unit 310*b* to be connected to the physical link 32*b* starts a negotiation for parameter setting for the Tx equalizer 314 in the state where the initial Tx parameter group notified in step S101 has been set in the Tx equalizer 314.

The parameter control unit 340 receives a set of values of the Tx parameter group which has been determined for the physical link 32*b* from the transmission/reception unit 310*b*. The parameter control unit 340 registers the set of values of the Tx parameter group received from the transmission/reception unit 310*b* to the "setting value" field associated with the corresponding wide port ID and the corresponding physical link ID in the Tx parameter table 332.

The parameter control unit 340 further receives a set of values of the Rx parameter group which has been set in the Rx equalizer 315 of the transmission/reception unit 310*f* at the destination at the time when the negotiation is completed, from the transmission/reception unit 310*f* via the transmission/reception unit 310*b*. The parameter control unit 340 registers the set of values of the Rx parameter group received from the transmission/reception unit 310*b* to the Rx parameter table.

Step S104: The transmission/reception unit 310*c* to be connected to the physical link 32*c* starts a negotiation for parameter setting for the Tx equalizer 314 in the state where the initial Tx parameter group notified in step S101 has been set in the Tx equalizer 314.

The parameter control unit 340 receives a set of values of the Tx parameter group which has been determined for the physical link 32*c* from the transmission/reception unit 310*c*. The parameter control unit 340 registers the set of values of the Tx parameter group received from the transmission/reception unit 310*c* to the "setting value" field associated with the corresponding wide port ID and the corresponding physical link ID in the Tx parameter table 332.

The parameter control unit 340 further receives a set of values of the Rx parameter group which has been set in the Rx equalizer 315 of the transmission/reception unit 310*g* at the destination at the time when the negotiation is completed, from the transmission/reception unit 310*g* via the transmission/reception unit 310*c*. The parameter control unit 340 registers the set of values of the Rx parameter group received from the transmission/reception unit 310*c* to the Rx parameter table.

Step S105: The transmission/reception unit 310*d* to be connected to the physical link 32*d* starts a negotiation for parameter setting for the Tx equalizer 314 in the state where the initial Tx parameter group notified in step S101 has been set in the Tx equalizer 314.

The parameter control unit 340 receives a set of values of the Tx parameter group which has been determined for the physical link 32*d* from the transmission/reception unit 310*d*. The parameter control unit 340 registers the set of values of the Tx parameter group received from the transmission/reception unit 310*d* to the "setting value" field associated with the corresponding wide port ID and the corresponding physical link ID in the Tx parameter table 332.

The parameter control unit 340 further receives a set of values of the Rx parameter group which has been set in the Rx equalizer 315 of the transmission/reception unit 310*h* at the destination at the time when the negotiation is completed, from the transmission/reception unit 310*h* via the transmission/reception unit 310*d*. The parameter control unit 340 registers the set of values of the Rx parameter group received from the transmission/reception unit 310*d* to the Rx parameter table.

Step S106: The parameter control unit 340 identifies the position of a Tx allowable range for the Tx parameter group on the basis of the distribution of sets of latest values of the Tx parameter group which have been received from the transmission/reception units 310*a* to 310*d*. The sets of latest values of the Tx parameter group are obtained from the Tx parameter table 332. The Tx allowable range is identified as an area having a certain size which includes sets of values of the Tx parameter group, the number of which is greater than or equal to a predetermined value, through the process described above.

The parameter control unit 340 further identifies the position of an Rx allowable range on the basis of the sets of values of the Rx parameter groups received from the transmission/reception units 310*a* to 310*d*, which have been registered in the Rx parameter table. The Rx allowable range is identified using the same method as that for the allowable range for the Tx parameter group for the Tx equalizer 314 of each of the transmission/reception units 310*a* to 310*d* on the basis of the range of error determined in advance for each Rx parameter. For example, the Rx allowable range is identified as an area having a certain size which includes sets of values of the Rx parameter group, the number of which is greater than or equal to a predetermined value, using the method described above with reference to FIG. 13.

Step S107: The parameter control unit 340 judges whether the sets of latest values of the Tx parameter group received from the transmission/reception units 310*a* to 310*d* include a set of values of the Tx parameter group that does not fall within (or is outside) the Tx allowable range identified in step S106.

If there is any set of values of the Tx parameter group that does not fall within the Tx allowable range, the parameter control unit 340 judges that the set of values of the Tx parameter group is inappropriate. Then, the process proceeds to step S110.

If there is no set of values of the Tx parameter group that does not fall within the Tx allowable range, the parameter control unit 340 judges that all of the sets of values of the Tx parameter group determined for the physical links 32a to 32d are appropriate. Then, the process proceeds to step S108.

In step S106, the allowable range may not be necessarily be identified since the number of sets of values of a parameter group which are concentrated in an area having a predetermined size is less than or equal to a predetermined value (for example, one-half of the number of physical links making up a wide port). In this case, the parameter control unit 340 judges that the sets of values of the parameter group determined for all the physical links are inappropriate. Then, the process proceeds to step S110.

Step S108: The parameter control unit 340 judges whether the sets of values of the Rx parameter groups received in steps S102 to S105 include a set of values of the Rx parameter group which does not fall within the Rx allowable range identified in step S106. If there is any set of values of the Rx parameter group that does not fall within the Rx allowable range, the parameter control unit 340 judges that the set of values of the Rx parameter group is inappropriate. Then, the process proceeds to step S110. If there is no set of values of the Rx parameter group that does not fall within the Rx allowable range, the process proceeds to step S109.

Step S109: The parameter control unit 340 initiates communication through the SAS controller 31a. The communication is initiated in the state where the sets of latest values of the Tx parameter group have been set in the respective Tx equalizers 314 of the transmission/reception units 310a to 310d in the SAS controller 31a. Further, the communication is initiated in the state where the sets of latest values of the Rx parameter group have been set in the respective Rx equalizers 315 of the transmission/reception units 310e to 310h in the SAS controller 31b.

Step S110: The parameter control unit 340 judges whether the number of times renegotiation has taken place in step S112 is less than a threshold value. If the number of times renegotiation has taken place is less than the threshold value, the process proceeds to step S111. If the number of times renegotiation has taken place is greater than or equal to the threshold value, the process proceeds to step S113.

Step S111: The following process is performed for a transmission/reception unit in which values of the Tx parameters which are judged in step S107 to be inappropriate have been set or for a transmission/reception unit that has received, from the test signal destination, values of the Rx parameters which are judged in the step S108 to be inappropriate. The parameter control unit 340 notifies each of the transmission/reception units described above of an initial Tx parameter group different from that for the negotiation that has already taken place to set the initial Tx parameter group in the corresponding Tx equalizer 314. Then, the parameter control unit 340 requests each of the transmission/reception units described above to perform a renegotiation.

Step S112: The transmission/reception unit requested in step S111 to perform a renegotiation (the transmission/reception unit associated with the corresponding physical link) performs a renegotiation for parameter setting for the Tx equalizer 314 in the state where the new initial Tx parameter group notified in step S111 has been set in the Tx equalizer 314.

The parameter control unit 340 receives, from the transmission/reception unit that has performed the renegotiation, a set of values of the Tx parameter group which has been determined by the renegotiation. The parameter control unit 340 overwrites the "setting value" field associated with the corresponding wide port ID and the corresponding physical link ID in the Tx parameter table 332 with the set of values of the Tx parameter group received from the transmission/reception unit to register the received set of values of the Tx parameter group. Accordingly, the sets of latest values of the Tx parameter group are registered in the Tx parameter table 332.

The parameter control unit 340 further receives the sets of values of the Rx parameter group which have been set in the Rx equalizers 315 of the destination transmission/reception units at the time when the renegotiation is completed, from the destination transmission/reception units via the source transmission/reception units. The parameter control unit 340 overwrites the Rx parameter table with the received sets of values of the Rx parameter group to register the received sets of values of the Rx parameter group.

Here, a renegotiation is executed in the state where, in steps S111 and S112, an initial Tx parameter group different from that in the previous negotiation is set in the Tx equalizer 314 of the transmission/reception unit for which the set of values of the Tx parameter group is judged in step S107 to be inappropriate. This results in the pattern of transitions of the Tx parameter group through the negotiation being different from that in the previous negotiation. In consequence, it is more probable that a more appropriate set of values of the Tx parameter group will be determined to be optimal. Further, a renegotiation is executed in the state where, also in steps S111 and S112, an initial Rx parameter group different from that in the previous negotiation is set in the Rx equalizer 315 of the transmission/reception unit for which the set of values of the Rx parameter group is judged in step S108 to be inappropriate. Thus, it is more probable that a more appropriate set of values of the Rx parameter group will be determined to be optimal.

In step S111, for example, for a physical link for which the set of values of the Tx parameter group has been judged to be appropriate in a previous negotiation, the initial Tx parameter group that was set during the previous negotiation may be set in a transmission/reception unit for which a renegotiation is to be executed. The initial Tx parameter group set in this case may be a set of values previously set for any transmission/reception unit other than the transmission/reception unit for which a renegotiation is to be executed, or may be a set of values previously set for the transmission/reception unit for which a renegotiation is to be executed. In either case, it is more probable that the pattern of transitions of the Tx parameter group during the renegotiation will be similar to that in the case where sets of values of the Tx parameter group were previously judged to be appropriate. In consequence, it is more probable that a more approximate set of values of the Tx parameter group will be determined to be optimal.

Step S113: The parameter control unit 340 requests the control circuit 352a of the SAS controller 31a to disconnect a physical link for which the set of values of the Tx parameter group has been judged in step S107 to be inappropriate, or a physical link for which the set of values of the Rx parameter group has been judged in step S108 to be inappropriate. The control circuit 352a stops the operation of the transmission/reception unit connected to the physical link requested to be disconnected, and causes only the remaining transmission/reception units to operate. Accordingly, communication is initiated using a wide port made up of only the physical links corresponding to the remaining transmission/reception units.

In step S113, the parameter control unit 340 may notify a transmission/reception unit corresponding to each physical link for which the set of values of the Tx parameter group has been judged in step S107 to be inappropriate of any of the sets of values of the Tx parameter group which have been judged in step S107 to be appropriate. The notified set of values of the Tx parameter group is set in the corresponding Tx equalizer 314. Then, the parameter control unit 340 initiates communication using all of the physical links 32a to 32d. Also in this case, a communication failure will be less likely to occur than in the case where each transmission/reception unit performs communication directly using the set of values of the Tx parameter group which is determined by a negotiation, resulting in an increase in communication stability.

Further, a process for forcibly setting any of the sets of values of the Tx parameter group which have been judged to be appropriate in a transmission/reception unit corresponding to each physical link for which the set of values of the Tx parameter group has been judged to be inappropriate may be limited to that in the case where, for example, the number of sets of values of the Tx parameter group judged in step S107 to be appropriate is greater than or equal to a predetermined value. The predetermined value may be, for example, a value such as ⅔ (two-third) of the total number of physical links. Such a limitation can reduce the probability that a communication failure will occur in each physical link for which the set of values of the Tx parameter group has been judged to be inappropriate.

Figure 17:
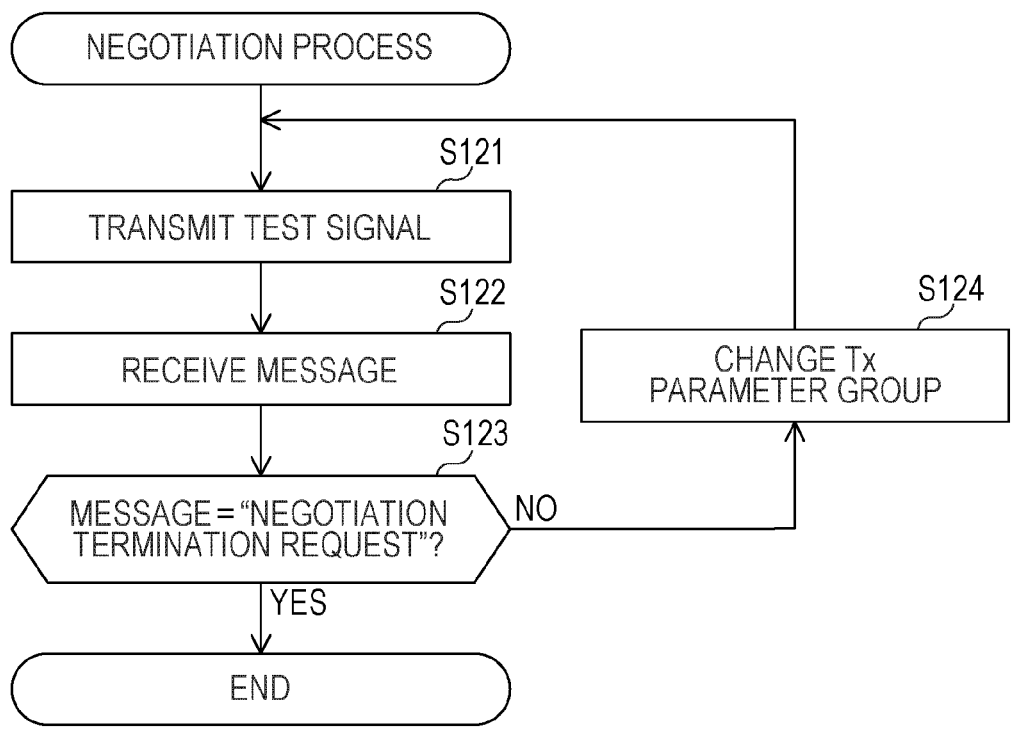
FIG. 17 is a flowchart illustrating an example of a negotiation process.

FIG. 17 is a flowchart illustrating an example of a negotiation process. The process illustrated in FIG. 17 is executed by an intended transmission/reception unit in steps S102 to S105 and S112 in FIG. 16. When the execution of the process illustrated in FIG. 17 is started, an initial Tx parameter group has been set in the Tx equalizer 314 of the intended transmission/reception unit in accordance with a request from the parameter control unit 340. At this time, an initial Rx parameter group has also been set in the Rx equalizer 315 of a counterpart transmission/reception unit connected to the intended transmission/reception unit. In the following, the process illustrated in FIG. 17 will be described in accordance with step numbers.

Step S121: The control circuit 321 causes the pulse generator 319 to output a test signal for negotiation. Accordingly, the test signal is transmitted to the counterpart transmission/reception unit via the connected physical link.

Step S122: The counterpart transmission/reception unit automatically adjusts the Rx parameters of the Rx equalizer 315, and determines whether or not to terminate the negotiation in accordance with the detection result obtained by the waveform detection circuit 320. Then, a message based on the determination of whether or not to terminate the negotiation is transmitted from the counterpart transmission/reception unit via the corresponding physical link. The control circuit 321 receives the transmitted message.

Step S123: The control circuit 321 judges whether the message received in step S122 is a negotiation termination request. If the received message is a negotiation termination request, the negotiation process ends. If the received message is a message other than a negotiation termination request (that is, a parameter adjustment request), the process proceeds to step S124.

Step S124: The control circuit 321 changes setting values of a Tx parameter group of the Tx equalizer 314 in accordance with the request received in step S122, or in accordance with a parameter adjustment request. For example, if the message code included in the received message is "0Ah", the control circuit 321 leaves the parameter C1 unchanged, decreases the parameter C2 by "2", and also decreases the parameter C3 by "2".

Then, the process proceeds to step S121. The process illustrated in FIG. 16 described above is executed each time, for example, a communication link between the SAS controller 31a and the SAS controller 31b is reconnected after the communication link has been disconnected. The process illustrated in FIG. 16 may be executed when, for example, the power to the CM 300a is turned on or when the power to the DE 210 is turned on from the power-off state while the CM 300a is in the power-on state. As described above, the process illustrated in FIG. 16 may be repeatedly performed.

Accordingly, the CM 300a may execute the following process. Each time values of parameters to be set for each physical link are determined by the execution of the process illustrated in FIG. 16, the parameter control unit 340 stores the determined values of the parameters in the parameter information storage unit 330. As a result of repeated application of the process illustrated in FIG. 16, when values of the parameters which have actually been set for each physical link, the number of which is equal to a predetermined value, are accumulated in the parameter information storage unit 330, the parameter control unit 340 computes the averages of the values of the parameters which have actually been set for each physical link. Thereafter, the parameter control unit 340 sets the averages computed for the corresponding physical link as an initial parameter group when executing the process illustrated in FIG. 16. After the computation of the averages, the amount of time taken for the parameter group setting process illustrated in FIG. 16 may be reduced with the maintained communication quality.

Third Embodiment

Next, a third embodiment will be described with reference to FIGS. 18 and 19. In the third embodiment, the Tx parameter group setting process according to the second embodiment which uses a negotiation between SAS controllers is modified. The third embodiment will be described using the same numerals for the hardware components and processing functions described in the second embodiment.

Figure 18:
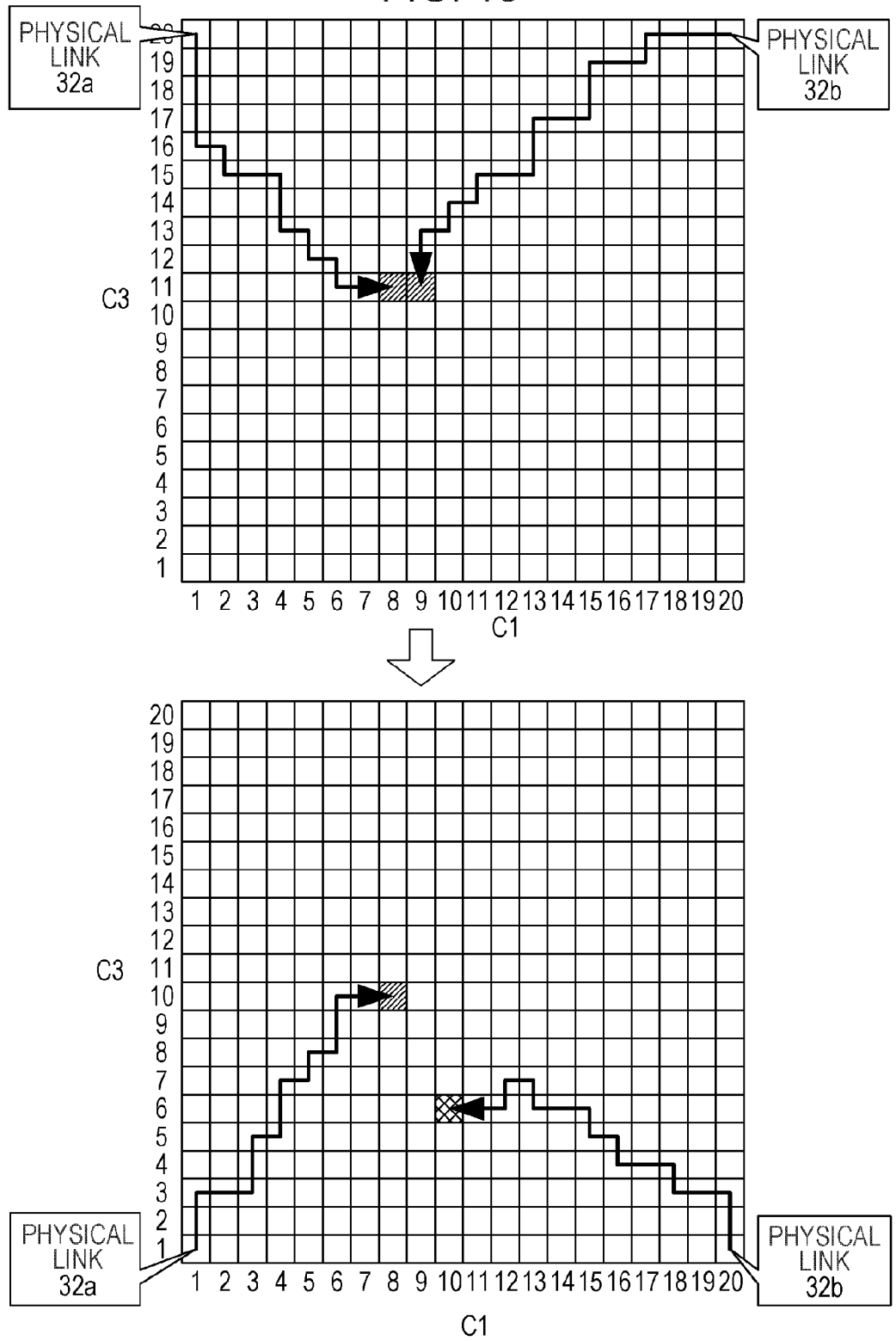
FIG. 18 is a diagram illustrating an example of judgment for a Tx parameter group according to a third embodiment.

FIG. 18 is a diagram illustrating an example of judgment for a Tx parameter group according to the third embodiment. In FIG. 18, a description will be made of a negotiation for a wide port made up of two physical links for transmission, by way of example. In FIG. 18, furthermore, it is assumed that, among the physical links 32a to 32d illustrated in FIG. 5, only two physical links, namely, the physical links 32a and 32b, make up a wide port. In FIG. 18, portions similar to those in FIG. 15 are not described herein.

In this case, first, as illustrated in the upper portion of FIG. 18, the parameter control unit 340 sets an initial Tx parameter group (1, 20) for the physical link 32a, and executes a negotiation for the first time. The parameter control unit 340 further sets an initial Tx parameter group (20, 20) for the physical link 32b, and executes a negotiation for the first time. As a result, it is assumed that a Tx parameter group (8, 11) is determined for the physical link 32a and a Tx parameter group (9, 11) is determined for the physical link 32b.

Then, as illustrated in the lower portion of FIG. 18, the parameter control unit 340 sets, for the physical link 32a, an initial Tx parameter group (1, 1) which is different from that for the negotiation performed for the first time, and executes the negotiation performed for the second time. The parameter control unit 340 further sets, for the physical link 32b, an initial Tx parameter group (20, 1) which is different from that for the negotiation performed for the first time, and executes the negotiation performed for the second time. As a result, it is assumed that a Tx parameter group (8, 10) is determined for the physical link 32a and a Tx parameter group (10, 6) is determined for the physical link 32b.

In this case, the parameter control unit 340 calculates an allowable range on the basis of the distribution of the Tx parameter groups (8, 11), (9, 11), (8, 10), and (10, 6) determined by the negotiation performed for the first time and the negotiation performed for the second time. For example, the parameter control unit 340 calculates the position of a Tx allowable range for each of all the combinations of the Tx parameter groups determined for the physical link 32a and the Tx parameter groups determined for the physical link 32b by using the procedure described above. That is, a Tx allowable range is calculated for each of the pair of Tx parameter groups (8, 11) and (9, 11), the pair of Tx parameter groups (8, 11) and (10, 6), the pair of Tx parameter groups (8, 10) and (9, 11), and the pair of Tx parameter groups (8, 10) and (10, 6).

As a result, a Tx allowable range (8 to 9, 10 to 11) is calculated from the pair of Tx parameter groups (8, 11) and (9, 11) and the pair of Tx parameter groups (8, 10) and (9, 11). In this case, the parameter control unit 340 judges that the Tx parameter group (8, 11) or the Tx parameter group (8, 10) is an appropriate Tx parameter group to be set in the transmission/reception unit 310a corresponding to the physical link 32a, and sets the values of either of the Tx parameter groups (8, 11) and (8, 10) in the transmission/reception unit 310a. Further, the parameter control unit 340 judges that the Tx parameter group (9, 11) is an appropriate Tx parameter group to be set in the transmission/reception unit 310b corresponding to the physical link 32b, and sets the values of the Tx parameter group (9, 11) in the transmission/reception unit 310b.

As described with reference to FIG. 18, a negotiation is executed a plurality of times for each physical link while the initial Tx parameter group is changed. Then, a Tx allowable range is identified by the negotiation performed the plurality of times on the basis of the distribution of the Tx parameter groups determined for each physical link, and any Tx parameter group that falls within the identified Tx allowable range among the determined Tx parameter groups is selected and set for each physical link. This enables a substantial increase in the number of patterns of transitions of the values of the Tx parameter groups during a negotiation even if the number of physical links making up a wide port is small (for example, even if the number of physical links is less than four), resulting in a Tx allowable range at an appropriate position being more likely to be identified. This provides accurate judgment of the appropriateness of the Tx parameter groups determined by a negotiation.

Figure 19:
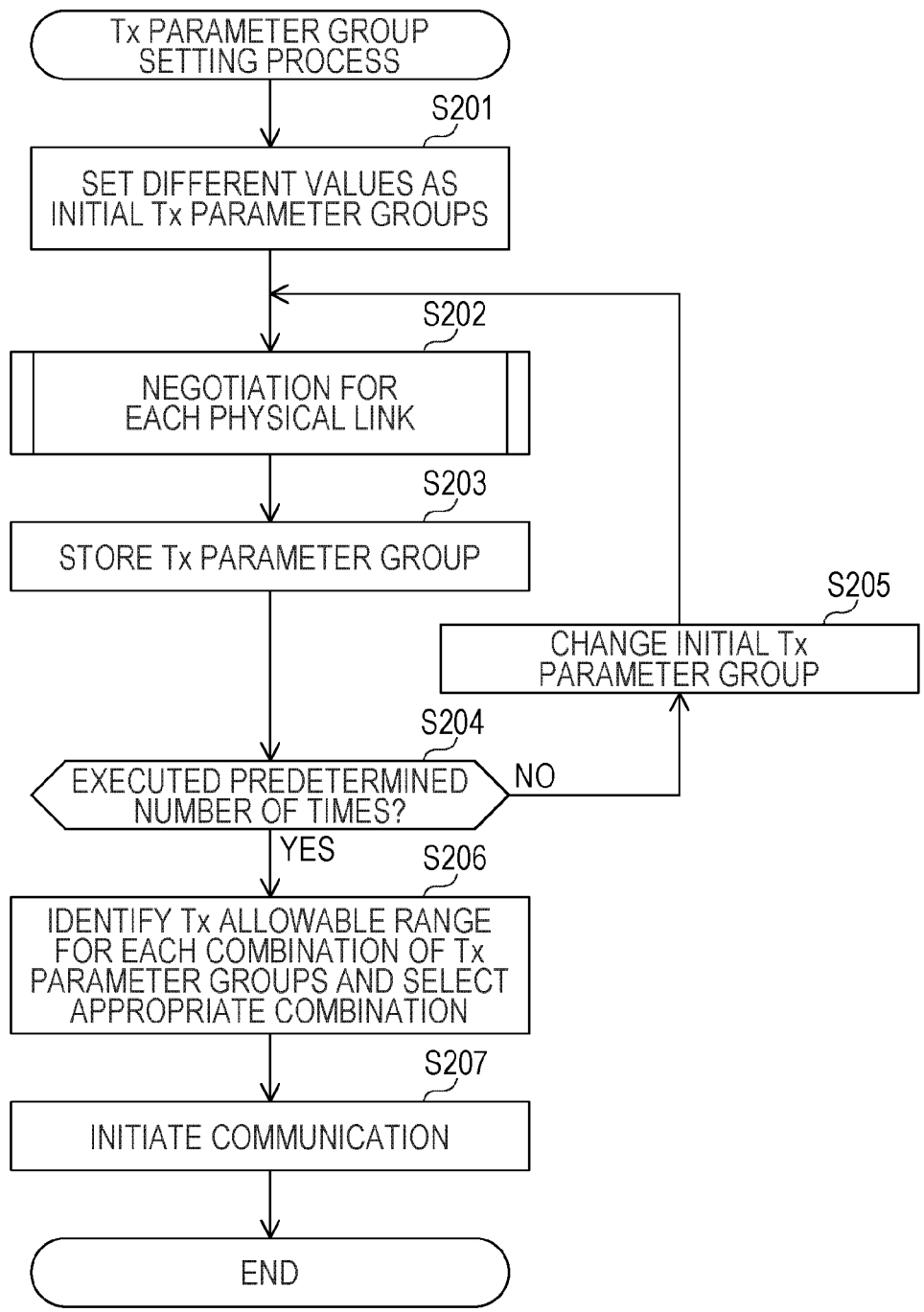
FIG. 19 is a flowchart illustrating an example of a process for setting a Tx parameter group according to the third embodiment.

FIG. 19 is a flowchart illustrating an example of a process for setting a Tx parameter group according to the third embodiment. Similarly to the process illustrated in FIG. 16, the illustrated process is a process in which the CM 300a sets Tx parameters of the Tx equalizer 314 of the SAS controller 31a included in the CM 300a. That is, the process illustrated in FIG. 19 is executed instead of the process illustrated in FIG. 16. In the following, the process illustrated in FIG. 19 will be described in accordance with step numbers.

Step S201: The parameter control unit 340 notifies transmission/reception units corresponding to physical links making up a wide port of different initial Tx parameter groups to set the initial Tx parameter groups in the respective Tx equalizers 314. Then, the parameter control unit 340 requests each of the transmission/reception units to perform a negotiation. The number of physical links making up a wide port is not limited to any specific number.

Step S202: In response to a request to perform a negotiation, each transmission/reception unit starts a negotiation in the state where the notified initial Tx parameter group has been set. The details of the negotiation process performed in each transmission/reception unit are similar to those illustrated in FIG. 8. Each transmission/reception unit transmits values of a Tx parameter group determined through the negotiation to the parameter control unit 340.

Step S203: The parameter control unit 340 stores the values of the Tx parameter groups determined for the respective transmission/reception units in the parameter information storage unit 330.

Step S204: The parameter control unit 340 judges whether the processes of steps S202 and S203 have been executed a predetermined number of times. If the processes have not been executed the predetermined number of times, the process proceeds to step S205. If the processes have been executed the predetermined number of times, the process proceeds to step S206.

Step S205: The parameter control unit 340 notifies the transmission/reception units corresponding to the respective physical links of initial Tx parameter groups different from those in the negotiation that has already taken place to set the initial Tx parameter groups in the respective Tx equalizers 314. Then, the parameter control unit 340 requests each of the transmission/reception units to perform a renegotiation.

The notified initial Tx parameter groups may be, for example, sets of values different from those in the negotiation that has already taken place from one physical link to another, or may be sets of values which have not been set in the negotiation that has already taken place for any of the physical links.

Step S206: The parameter control unit 340 extracts all the combinations of Tx parameter groups obtained by combining the Tx parameter groups for the respective physical links, one by one, among the already set Tx parameter groups stored in the parameter control unit 340. The parameter control unit 340 identifies the position of a Tx allowable range having the same size for each of the extracted combinations of Tx parameter groups. The positions of the Tx allowable ranges may be identified in a way similar to that in step S106 in FIG. 16.

The parameter control unit 340 selects Tx allowable ranges having the largest number of Tx parameter groups among the Tx allowable ranges identified for the combinations of Tx parameter groups. Further, the parameter control unit 340 selects, from among the selected Tx allowable ranges, a Tx allowable range in which the difference between the maximum value and the minimum value among the values of the Tx parameter groups included in the selected Tx allowable range is the smallest. Then, the parameter control unit 340 selects a combination of Tx parameter groups within the selected Tx allowable range as the most appropriate combination.

Step S207: The parameter control unit 340 sets the values of the Tx parameter groups included in the selected combination of Tx parameter groups in the Tx equalizer 314 of the corresponding transmission/reception unit, and initiates communication using the respective transmission/reception units.

In FIG. 19, the setting of Rx parameters in the transmission/reception unit of the SAS controller 31b at the destination is not illustrated. In steps S201 and S205, similarly to the Tx parameters, different initial values of the Rx parameters may also be set for the respective transmission/reception units.

The parameter group setting process described above in the second and third embodiments is also applicable to communication via a PCIe bus. The parameter group setting process is also applicable to, for example, communication between the PCIe switch 303a and the PCIe switch 303b illustrated in FIG. 3.

In PCIe, a physical link in the foregoing description is referred to as a "lane". Further, PCIe defines a method for communication using a plurality of lanes as a single logical communication port. Therefore, physical links in the foregoing description are associated with lanes so that a parameter group setting process similar to that in the second and third embodiments can also be implemented in communication via a PCIe bus.

Fourth Embodiment

Next, a fourth embodiment will be described. Components common to those in the second embodiment described above are given the same numerals, and a description thereof is omitted.

In the fourth embodiment, the storage system 100 according to the second embodiment is further provided with an additional function of locating the site of failure in response to the occurrence of a communication failure. Communication using a wide port generally makes it possible to determine in which physical link a communication failure has occurred in response to the occurrence of the communication failure. However, it is difficult to locate in which hardware component related to the physical link the failure has occurred. Thus, it is difficult to determine the site of the occurrence of the failure to replace only parts at the site, which may hinder an increase in the efficiency of the maintenance activities. In the fourth embodiment, the issue described above may be overcome by using the technique disclosed in the second embodiment.

Figure 20:
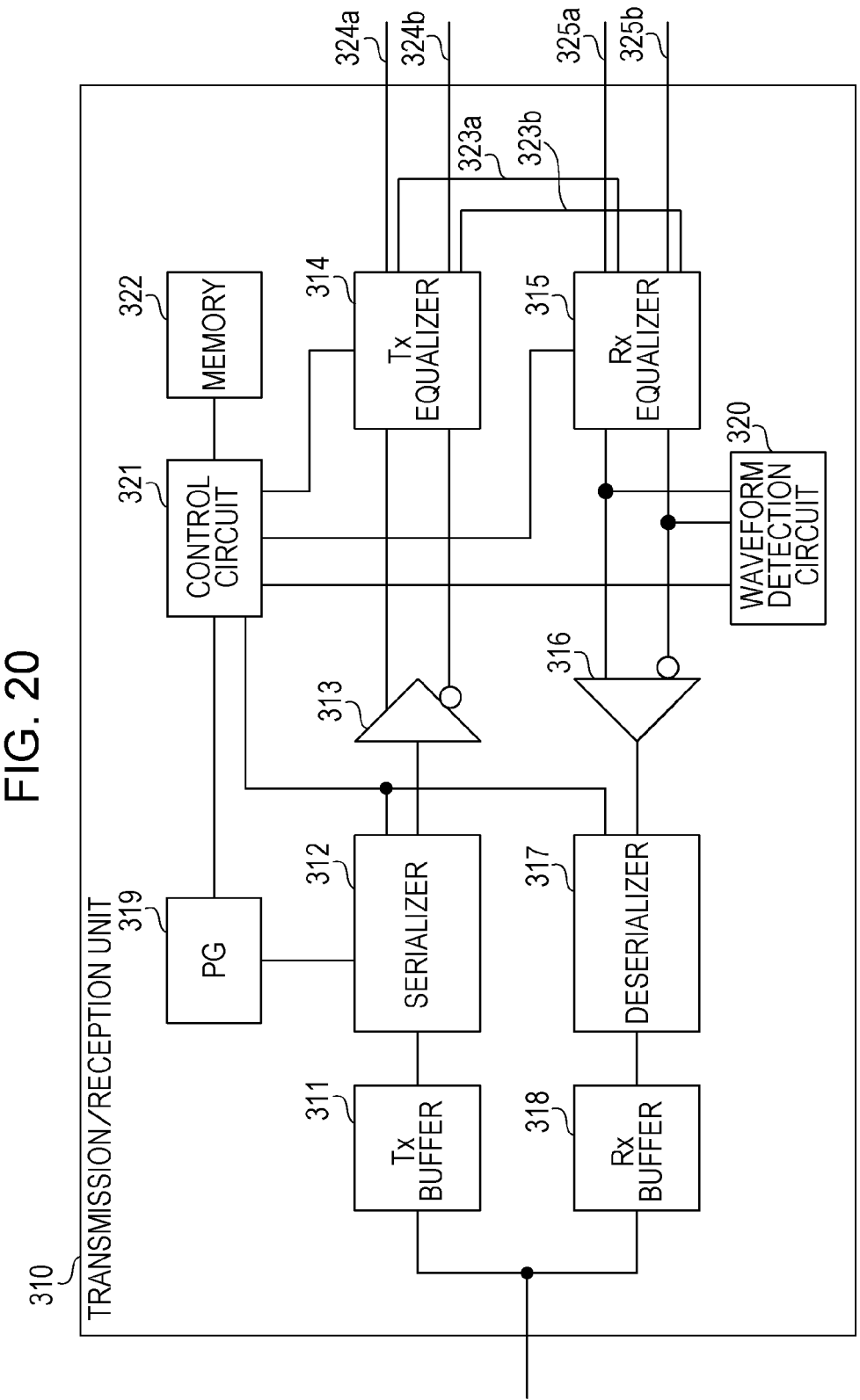
FIG. 20 is a diagram illustrating an example hardware configuration of a transmission/reception unit according to a fourth embodiment.

FIG. 20 is a diagram illustrating an example hardware configuration of a transmission/reception unit according to the fourth embodiment. The transmission/reception unit 310 according to the fourth embodiment is configured such that signal lines 323a and 323b are added to the transmission/reception unit 310 according to the second embodiment.

In FIG. 20, signal lines 324a and 324b are differential signal lines through which the Tx equalizer 314 transmits signals to the communication partner transmission/reception unit via a connector (not illustrated). Signal lines 325a and 325b are differential signal lines through which the Rx equalizer 315 receives signals from the communication partner transmission/reception unit via a connector (not illustrated). The signal lines 323a and 323b are signal lines for connecting the output of the Tx equalizer 314 to the input of the Rx equalizer 315. The Tx equalizer 314 causes signals to flow only through either the signal lines 324a and 324b or the signal lines 323a and 323b in accordance with an instruction from the control circuit 321. The Rx equalizer 315 further causes signals to flow only through either the signal lines 325a and 325b or the signal lines 323a and 323b in accordance with an instruction from the control circuit 321. In the following description, the state where signals flow through the signal lines 323a and 323b is referred to as the "loopback state".

The transmission/reception unit 310 is capable of performing a negotiation for parameter setting in the loopback state in accordance with an instruction from an external CPU (for example, the CPU 301a of the CM 300a) disposed outside a SAS controller. In response to an instruction for the negotiation, the control circuit 321 instructs the Tx equalizer 314 and the Rx equalizer 315 to enter the loopback state in which signals flow through the signal lines 323a and 323b. Then, a negotiation is performed between the Tx equalizer 314 and the Rx equalizer 315 in the same transmission/reception unit 310 using a procedure similar to the procedure in the second embodiment for a negotiation between the Tx equalizer 314 on the transmit side and the Rx equalizer 315 on the receive side.

In the negotiation in the loopback state, a test signal output from the pulse generator 319 is transmitted from the Tx equalizer 314 to the Rx equalizer 315 via the signal lines 323a and 323b under the control of the control circuit 321. The Rx equalizer 315 automatically adjusts Rx parameters to shape the waveform of the received test signal, and the shaped waveform is detected by the waveform detection circuit 320. The detection result is provided to the control circuit 321. If the provided detection result does not satisfy a predetermined reference, the control circuit 321 changes a setting value of a Tx parameter and causes a test signal to be transmitted again. The control circuit 321 repeatedly performs the process described above until the detection result provided from the waveform detection circuit 320 satisfies the predetermined reference, and outputs a value of the Tx parameter and a value of the Rx parameter which are obtained when the detection result satisfies the reference to the external CPU as determined values.

That is, the negotiation in the loopback state is equivalent to a negotiation obtained by simulating, inside the same transmission/reception unit, the execution of a negotiation between the transmit side and the receive side described in the second embodiment. The negotiation in the loopback state is different from the negotiation between the transmit side and the receive side described in the second embodiment in that the operations on both the transmit side and the receive side are controlled by the control circuit 321 and the messages illustrated in FIG. 9 for changing Tx parameters are not transmitted or received between transmission/reception units.

In the storage system 100 according to the fourth embodiment, at least in a case where, as illustrated in FIG. 5, the SAS controllers 31a and 31b that communicate with each other are mounted in different devices, the transmission/reception units 310a to 310d of the SAS controller 31a and the transmission/reception units 310e to 310h of the SAS controller 31b have each a configuration similar to that of the transmission/reception unit 310 illustrated in FIG. 20. The fourth embodiment provides determination of, in response to the occurrence of a communication failure in any physical link connecting the SAS controllers 31a and 31b, whether the site of the failure is the SAS controller 31a, the SAS controller 31b, or any other site (for example, a transmission path).

The following description will be made of, by way of example, the SAS expander 306a of the CM 300a and the SAS expander 211a of the DE 210 to describe the location of the site of the failure. Specifically, it is assumed that the SAS controller 31a is mounted in the SAS expander 306a of the CM 300a and the SAS controller 31b is mounted in the SAS expander 211a of the DE 210.

As for communication between the SAS controllers 31a and 31b, loopback training, which is performed before the initiation of the communication, and a loopback test, which is performed in response to the occurrence of a communication failure, are executed. In the loopback training, the transmission/reception units 310a to 310h are brought into the loopback state and a negotiation for parameter setting is performed for each of the transmission/reception units 310a to 310h. The CM 300a identifies a Tx allowable range and an Rx allowable range for each of the SAS controllers 31a and 31b on the basis of values of the Tx parameter and values of the Rx parameter which are obtained as a result of the negotiation, and holds the values.

In response to the occurrence of a communication failure in any physical link after initiation of the communication between the SAS controllers 31a and 31b, a loopback test for the transmission/reception unit corresponding to the physical link is executed. In the loopback test, the transmission/reception unit is brought into the loopback state and a negotiation for parameter setting is performed using a procedure similar to that in the loopback training. The CM 300a judges whether a value of the Tx parameter and a value of the Rx parameter which are obtained as a result of the negotiation are included in the Tx allowable range and Rx allowable range identified in the loopback training, respectively, to locate the site of the failure.

Figure 21:
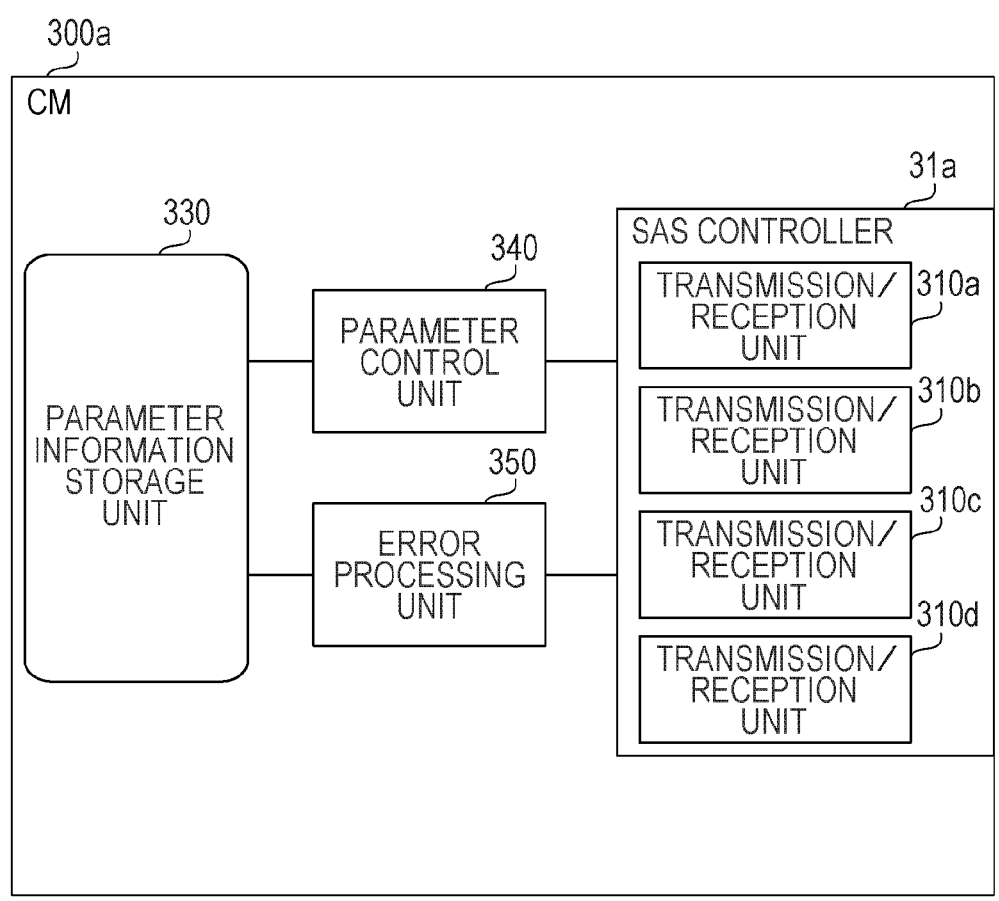
FIG. 21 is a block diagram illustrating example functions of a CM according to the fourth embodiment.

FIG. 21 is a block diagram illustrating example functions of a CM according to the fourth embodiment. While the CM 300a is illustrated in FIG. 21, the CM 300b may also have functions similar to those of the CM 300a. The CM 300a according to the fourth embodiment is different from the CM 300a according to the second embodiment in that the CM 300a according to the fourth embodiment further includes an error processing unit 350. The error processing unit 350 is implemented by, for example, the CPU 301a included in the CM 300a executing a predetermined program.

In the parameter information storage unit 330, a Tx training table, an Rx training table, a Tx allowable range table, and an Rx allowable range table are further registered. In the Tx training table, sets of values of a Tx parameter group which are determined for the transmission/reception units 310a to 310h through the loopback training are registered. In the Rx training table, sets of values of an Rx parameter group which are determined for the transmission/ reception units 310a to 310h through the loopback training are registered. In the Tx allowable range table, information indicating a Tx allowable range identified based on the sets of values of the Tx parameter group which are determined through the loopback training is registered. In the Rx allowable range table, information indicating a Tx allowable range identified based on the sets of values of the Rx parameter group which are determined through the loopback training is registered.

Next, the additional functions of the parameter control unit 340 according to the fourth embodiment will be described. The parameter control unit 340 executes the loopback training to determine a Tx allowable range and an Rx allowable range before executing the parameter group setting process illustrated in FIG. 16. The parameter control unit 340 instructs each of the transmission/reception units 310a to 310d to perform a negotiation in the loopback state. In this case, the parameter control unit 340 notifies each of the transmission/reception units 310a to 310d of a different initial Tx parameter group and a different initial Rx parameter group. Each of the transmission/reception units 310a to 310d executes a negotiation for parameter setting in the loopback state, and determines a set of values of a Tx parameter group and a set of values of an Rx parameter group. The parameter control unit 340 obtains the determined set of values of the Tx parameter group and the determined set of values of the Rx parameter group from each of the transmission/reception units 310a to 310d. The parameter control unit 340 registers the obtained sets of values of the Tx parameter group to the Tx training table, and registers the obtained sets of values of the Rx parameter group to the Rx training table.

The parameter control unit 340 refers to the Tx training table, and identifies the position of a Tx allowable range on the basis of the distribution of the sets of values of the Tx parameter group obtained from the transmission/reception units 310a to 310d. As described above with reference to, for example, FIG. 13, the Tx allowable range is identified as an area having a certain size which includes sets of values of the Tx parameter group, the number of which is greater than or equal to a predetermined value. The parameter control unit 340 registers the identified Tx allowable range to the Tx allowable range table. The parameter control unit 340 further refers to the Rx training table, and identifies the position of an Rx allowable range on the basis of the sets of values of the Rx parameter group obtained from each of the transmission/reception units 310a to 310d. The parameter control unit 340 registers the identified Rx allowable range to the Rx allowable range table.

Here, each of the transmission/reception units 310e to 310h of the SAS controller 31b also executes a negotiation in the loopback state before communication is actually initiated between the SAS controller 31a and the SAS controller 31b. The negotiation is executed, for example, immediately after the power to the DE 210 has been turned on. Each of the transmission/reception units 310e to 310h is notified of a different initial Tx parameter group and a different initial Rx parameter group by the CPU 213. The initial Tx parameter group and the initial Rx parameter group are stored in the flash memory 214. Each of the transmission/reception units 310e to 310h executes a negotiation in the loopback state, and determines a set of values of a Tx parameter group and a set of values of an Rx parameter group. The parameter control unit 340 obtains the determined set of values of the Tx parameter group and the determined set of values of the Rx parameter group from each of the transmission/reception units 310e to 310h. The parameter control unit 340 registers the obtained sets of values of the Tx parameter group to the Tx training table, and registers the obtained sets of values of the Rx parameter group to the Rx training table.

The parameter control unit 340 refers to the Tx training table, and identifies the position of a Tx allowable range on the basis of the distribution of the sets of values of the Tx parameter group obtained from the transmission/reception units 310e to 310h. The parameter control unit 340 registers the identified Tx allowable range to the Tx allowable range table. The parameter control unit 340 further refers to the Rx training table, and identifies the position of an Rx allowable range on the basis of the sets of values of the Rx parameter group obtained from the transmission/reception units 310e to 310h. The parameter control unit 340 registers the identified Rx allowable range to the Rx allowable range table.

As described above, in the Tx allowable range table, the Tx allowable range for the CM-side transmission/reception units 310a to 310d and the Tx allowable range for the DE-side transmission/reception units 310e to 310h are registered. Also, in the Rx allowable range table, the Rx allowable range for the CM-side transmission/reception units 310a to 310d and the Rx allowable range for the DE-side transmission/reception units 310e to 310h are registered. The registered Tx allowable range and Rx allowable range are used as indicators to judge, in response to the occurrence of a communication failure, whether or not the failure has occurred in any CM-side transmission/reception unit and whether or not the failure has occurred in any DE-side transmission/reception unit, respectively. Here, separate allowable ranges are identified for the CM-side transmission/reception units and the DE-side transmission/reception units because a difference in vendor between the CM-side transmission/reception units and the DE-side transmission/reception units or a difference in the environment of installation (for example, temperature) between transmission/reception units is presumed to cause different allowable ranges to be created for the CM-side transmission/reception units and the DE-side transmission/reception units.

Upon sensing of a physical link in which a communication failure has occurred after initiation of communication between the SAS controllers 31a and 31b, the error processing unit 350 notifies the management terminal 130 of a warning and executes a loopback test. The error processing unit 350 instructs the CM-side transmission/reception unit and the DE-side transmission/reception unit which are connected to the physical link in which the communication failure has occurred to perform a negotiation in the loopback state. The error processing unit 350 obtains a set of values of a Tx parameter group and a set of values of an Rx parameter group, which are determined through the negotiation, from the CM-side transmission/reception unit and the DE-side transmission/reception unit.

If the set of values of the Tx parameter group determined by the CM-side transmission/reception unit does not fall within the Tx allowable range for the CM-side transmission/reception unit identified through the loopback training, the error processing unit 350 judges that the CM-side transmission/reception unit is the site of the failure. If the set of values of the Rx parameter group determined by the CM-side transmission/reception unit does not fall within the Rx allowable range for the CM-side transmission/reception unit identified through the loopback training, the error processing unit 350 also judges that the CM-side transmission/reception unit is the site of the failure.

If the set of values of the Tx parameter group determined by the DE-side transmission/reception unit does not fall within the Tx allowable range for the DE-side transmission/reception unit identified through the loopback training, the error processing unit 350 judges that the DE-side transmission/reception unit is the site of the failure. If the set of values of the Rx parameter group determined by the DE-side transmission/reception unit does not fall within the Rx allowable range for the DE-side transmission/reception unit identified through the loopback training, the error processing unit 350 also judges that the DE-side transmission/reception unit is the site of the failure.

If it is not determined that the CM-side transmission/reception unit or the DE-side transmission/reception unit is the site of the failure, the error processing unit 350 judges that the transmission path of the physical link in which the communication failure has occurred is the site of the failure. The error processing unit 350 causes information indicating the site of the failure to be displayed on the management terminal 130.

FIG. 22 is a diagram illustrating an example of a Tx training table. A Tx training table 333 is stored in the parameter information storage unit 330.

The Tx training table 333 has a "wide port ID" field, a "physical link ID" field, a "parameter type" field, and a "setting value" field. In the "wide port ID" field, an identifier for identifying a wide port is registered. A wide port ID is associated with a SAS controller. Accordingly, at least two wide port IDs corresponding to two SAS controllers connected to each other are registered in the Tx training table 333. In the "physical link ID" field, identifiers for identifying physical links making up each of the wide ports are registered. In the "parameter type" field, information indicating the types of Tx parameters is registered. In the "setting value" field, values of a Tx parameter group set for a corresponding parameter type are registered.

The Rx training table has the same fields as those in the Tx training table 333, and is not described herein. In the "parameter type" field in the Rx training table, information indicating types of Rx parameters is registered.

FIG. 23 is a diagram illustrating an example of a Tx allowable range table. A Tx allowable range table 334 is stored in the parameter information storage unit 330. The Tx allowable range table 334 has a "wide port ID" field, a "parameter type" field, and a "range" field.

In the "wide port ID" field, an identifier for identifying a wide port is registered. In the "parameter type" field, information indicating types of Tx parameters is registered. In the "range" field, information indicating a Tx allowable range for each parameter type is registered. The information indicating a Tx allowable range indicates the position of the Tx allowable range rather than the width of the Tx allowable range, and specifically indicates the lower limit value and upper limit value of the range.

The Rx allowable range table has the same fields as those in the Tx allowable range table 334, and is not described herein. In the "parameter type" field in the Rx allowable range table, information indicating types of Rx parameters is registered.

Figure 24:
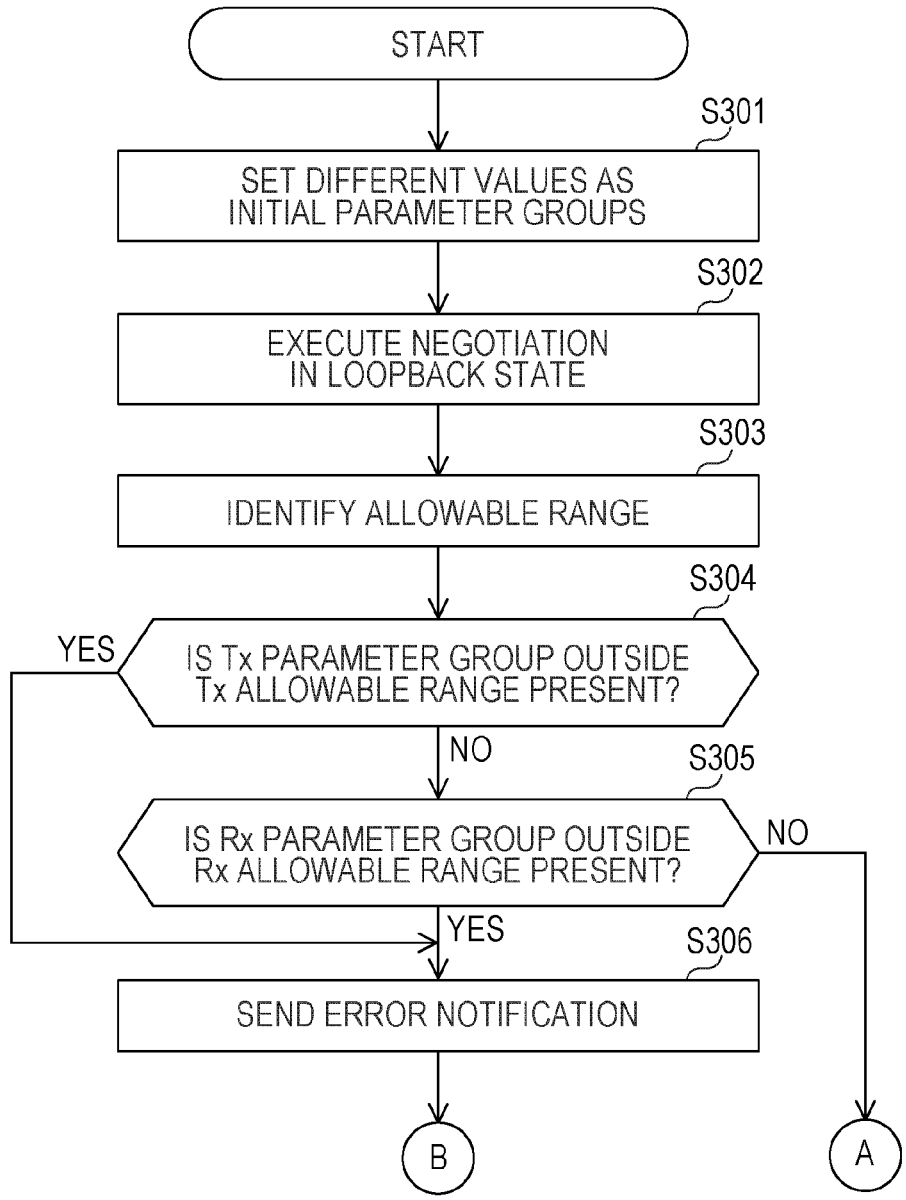
FIG. 24 is a flowchart illustrating an example (part 1) of loopback training.

FIG. 24 is a flowchart illustrating an example (part 1) of loopback training. In the following, the process illustrated in FIG. 24 will be described in accordance with step numbers. The process illustrated in FIG. 24 is executed, for example, immediately after the CM 300a has been activated.

Step S301: The parameter control unit 340 notifies each of the transmission/reception units 310a to 310d of a different initial Tx parameter group to set the initial Tx parameter group in the corresponding Tx equalizer 314. The parameter control unit 340 further notifies each of the transmission/reception units 310a to 310d of a different initial Rx parameter group to set the initial Rx parameter group in the corresponding Rx equalizer 315. Then, the parameter control unit 340 instructs each of the transmission/reception units 310a to 310d to perform a negotiation in the loopback state.

Step S302: Each of the transmission/reception units 310a to 310d sets the initial Tx parameter group and initial Rx parameter group notified in step S301 in the Tx equalizer 314 and the Rx equalizer 315, respectively. Then, each of the transmission/reception units 310a to 310d executes a negotiation between the Tx equalizer 314 and the Rx equalizer 315.

For example, the transmission/reception unit 310a sets the initial Tx parameter group and initial Rx parameter group notified in step S301 in the Tx equalizer 314 and the Rx equalizer 315 in the transmission/reception unit 310a, respectively. Then, the transmission/reception unit 310a executes a negotiation between the Tx equalizer 314 and the Rx equalizer 315 in the transmission/reception unit 310a. The procedure of the negotiation is as described with reference to FIG. 20. The transmission/reception unit 310a determines a set of values of a Tx parameter group for the Tx equalizer 314 and a set of values of an Rx parameter group for the Rx equalizer 315 through the negotiation. Each of the transmission/reception units 310b to 310d also determines a set of values of the Tx parameter group and a set of values of the Rx parameter group in a similar way.

Each of the transmission/reception units 310a to 310d transmits the determined set of values of the Tx parameter group and the determined set of values of the Rx parameter group to the parameter control unit 340. The parameter control unit 340 registers the set of values of the Tx parameter group and the set of values of the Rx parameter group received from each of the transmission/reception units 310a to 310d to the Tx training table 333 and the Rx training table, respectively.

Step S303: The parameter control unit 340 identifies the position of a Tx allowable range on the basis of the distribution of the sets of values of the Tx parameter group received from the transmission/reception units 310a to 310d. The sets of values of the Tx parameter group are obtained from the Tx training table 333. As described with reference to, for example, FIG. 13, the Tx allowable range is identified as an area having a certain size which includes sets of values of the Tx parameter group, the number of which is greater than or equal to a predetermined value. The parameter control unit 340 registers the identified Tx allowable range to the Tx allowable range table 334.

The parameter control unit 340 further identifies the position of an Rx allowable range on the basis of the distribution of the sets of values of the Rx parameter group received from the transmission/reception units 310a to 310d. The sets of values of the Rx parameter group are obtained from the Rx training table. Similarly to the Tx allowable range, the Rx allowable range is also identified as an area having a certain size which includes sets of values of the Rx parameter group, the number of which is greater than or equal to a predetermined value. The parameter control unit 340 registers the identified Rx allowable range to the Rx allowable range table.

Step S304: The parameter control unit 340 judges whether the sets of values of the Tx parameter group received from the transmission/reception units 310a to 310d include a set of values of the Tx parameter group that does not fall within the Tx allowable range identified in step S303. If there is any set of values of the Tx parameter group that does not fall within the Tx allowable range, the process proceeds to step S306. If there is no set of values of the Tx parameter group that does not fall within the Tx allowable range, the process proceeds to step S305.

Step S305: The parameter control unit 340 judges whether the sets of values of the Rx parameter group received from the transmission/reception units 310a to 310d include a set of values of the Rx parameter group that does not fall within the Rx allowable range identified in step S303. If there is any set of values of the Rx parameter group that does not fall within the Rx allowable range, the process proceeds to step S306. If there is no set of values of the Rx parameter group that does not fall within the Rx allowable range, the parameter control unit 340 executes the parameter group setting process illustrated in FIG. 16. Then, when communication becomes available between the CM 300a or the CM 300b and the DE 210, the process proceeds to step S311.

Step S306: The parameter control unit 340 provides the management terminal 130 with an error notification indicating that a transmission/reception unit that has transmitted the set of values of the Tx parameter group that does not fall within the Tx allowable range or the set of values of the Rx parameter group that does not fall within the Rx allowable range is in an abnormal condition. Then, the process ends.

Figure 25:
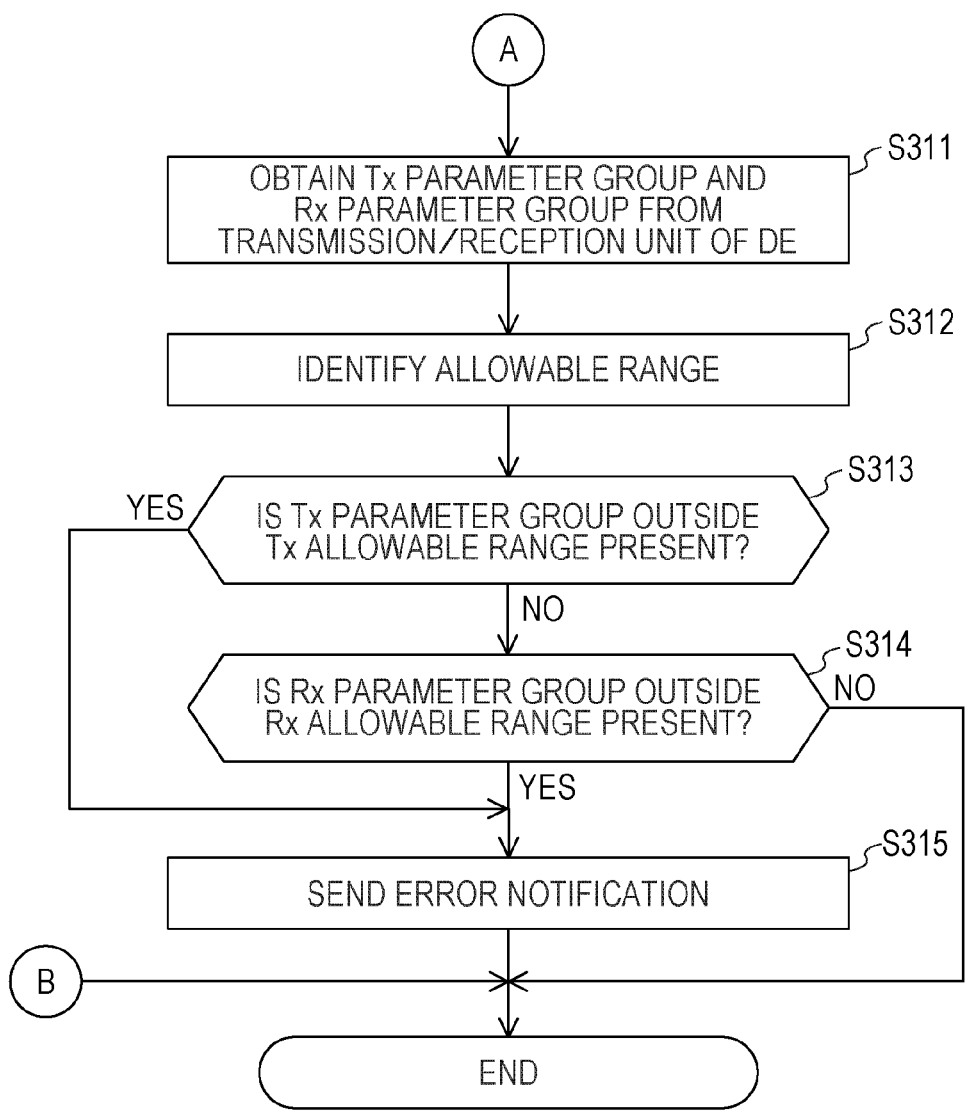
FIG. 25 is a flowchart illustrating an example (part 2) of the loopback training.

FIG. 25 is a flowchart illustrating an example (part 2) of the loopback training. In the following, the process illustrated in FIG. 25 will be described in accordance with step numbers.

Step S311: In the DE 210, each of the transmission/reception units 310e to 310h executes a negotiation in the loopback state under the control of the CPU 213 for a period until the process of step S311 is executed. The negotiation is executed, for example, immediately after the DE 210 has been activated.

The parameter control unit 340 transmits a parameter transmission request to the CPU 213 of the DE 210. The parameter control unit 340 obtains the sets of values of the Tx parameter group and the sets of values of the Rx parameter group, which have been determined by the transmission/reception units 310e to 310h, from the CPU 213 of the DE 210. The parameter control unit 340 registers the obtained sets of values of the Tx parameter group and the obtained sets of values of the Rx parameter group to the Tx training table 333 and the Rx training table, respectively.

Step S312: The parameter control unit 340 refers to the Tx training table 333, and identifies the position of a Tx allowable range on the basis of the distribution of the sets of values of the Tx parameter group determined by the transmission/reception units 310e to 310h. The parameter control unit 340 registers the identified Tx allowable range to the Tx allowable range table 334. Further, the parameter control unit 340 refers to the Rx training table, and identifies the position of an Rx allowable range on the basis of the distribution of the sets of values of the Rx parameter group determined by the transmission/reception units 310e to 310h. The parameter control unit 340 registers the identified Rx allowable range to the Rx allowable range table.

Step S313: The parameter control unit 340 judges whether the sets of values of the Tx parameter group determined by the transmission/reception units 310e to 310h include a set of values of the Tx parameter group that does not fall within the Tx allowable range identified in step S312. If there is any set of values of the Tx parameter group that does not fall within the Tx allowable range, the process proceeds to step S315. If there is no set of values of the Tx parameter group that does not fall within the Tx allowable range, the process proceeds to step S314.

Step S314: The parameter control unit 340 judges whether the sets of values of the Rx parameter group determined by the transmission/reception units 310e to 310h include a set of values of the Rx parameter group that does not fall within the Rx allowable range identified in step S312. If there is any set of values of the Rx parameter group that does not fall within the Rx allowable range, the process proceeds to step S315. If there is no set of values of the Rx parameter group that does not fall within the Rx allowable range, the process ends.

Step S315: The parameter control unit 340 provides the management terminal 130 with an error notification indicating that a transmission/reception unit for which the determined set of values of the Tx parameter group does not fall within the Tx allowable range or the determined set of values of the Rx parameter group does not fall within the Rx allowable range is in an abnormal condition. Then, the process ends.

Through the process illustrated in FIGS. 24 and 25, if the process of step S306 or step S315 is not executed, the Tx allowable range for the CM-side transmission/reception units 310a to 310d and the Tx allowable range for the DE-side transmission/reception units 310e to 310h are registered to the Tx allowable range table 334. Additionally, the Rx allowable range for the CM-side transmission/reception units 310a to 310d and the Rx allowable range for the DE-side transmission/reception units 310e to 310h are also registered to the Rx allowable range table.

Figure 26:
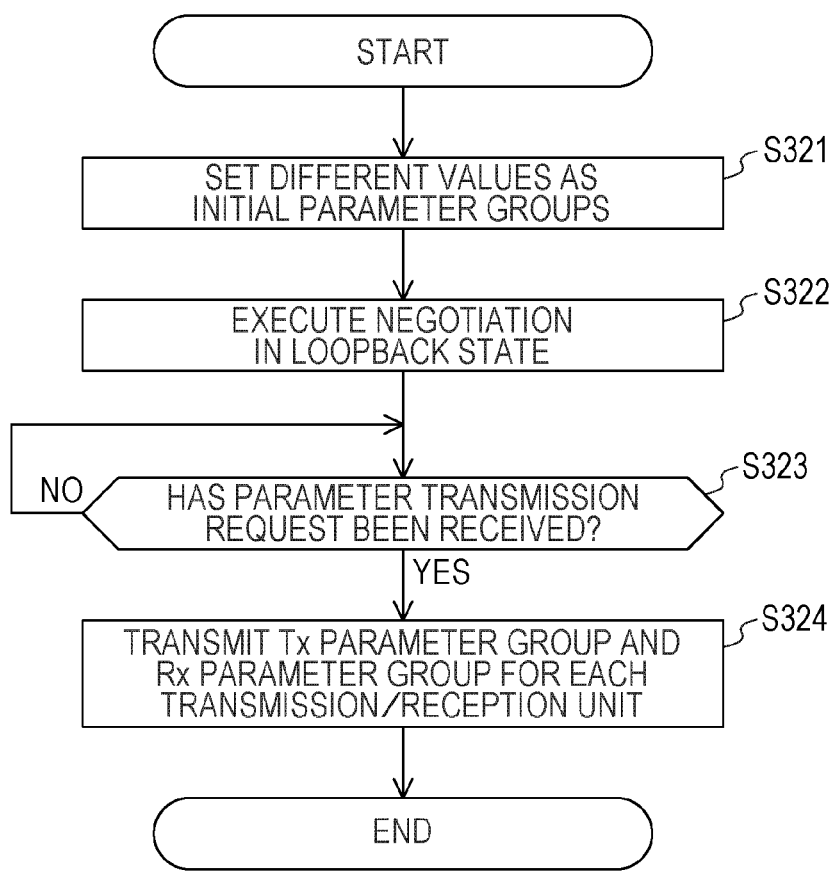
FIG. 26 is a flowchart illustrating an example of a negotiation process performed in a SAS controller of a DE.

FIG. 26 is a flowchart illustrating an example of a negotiation process performed in a SAS controller of a DE. The process illustrated in FIG. 26 is executed, for example, immediately after the DE 210 has been activated.

Step S321: The CPU 213 of the DE 210 notifies each of the transmission/reception units 310e to 310h of a different initial Tx parameter group to set the initial Tx parameter group in the corresponding Tx equalizer 314. The CPU 213 further notifies each of the transmission/reception units 310e to 310h of a different initial Rx parameter group to set the initial Rx parameter group in the corresponding Rx equalizer 315. Then, the CPU 213 instructs each of the transmission/reception units 310e to 310h to perform a negotiation in the loopback state.

Step S322: Each of the transmission/reception units 310e to 310h sets the initial Tx parameter group and initial Rx parameter group notified in step S321 in the Tx equalizer 314 and the Rx equalizer 315, respectively. Then, each of the transmission/reception units 310e to 310h executes a negotiation between the Tx equalizer 314 and the Rx equalizer 315. Accordingly, each of the transmission/reception units 310e to 310h determines a set of values of a Tx parameter group and a set of values of an Rx parameter group. Each of the transmission/reception units 310e to 310h transmits the determined set of values of the Tx parameter group and the determined set of values of the Rx parameter group to the CPU 213.

Step S323: The CPU 213 judges whether a parameter transmission request has been received from the parameter control unit 340 of the CM 300a. If no parameter transmission request has been received, the CPU 213 executes the process of step S323 again after a certain period of time. If a parameter transmission request has been received, the process proceeds to step S324. The parameter transmission request is transmitted from the parameter control unit 340 in step S311 in FIG. 25.

Step S324: The CPU 213 transmits the sets of values of the Tx parameter group and the sets of values of the Rx parameter group to the parameter control unit 340.

For example, after step S322, the CPU 213 of the DE 210 may identify a Tx allowable range and an Rx allowable range for the transmission/reception units 310e to 310h, instead of the processes of steps S323 and S324 and step S312 in FIG. 25 being performed. In this case, the parameter control unit 340 of the CM 300a obtains a Tx allowable range and an Rx allowable range for the transmission/reception units 310e to 310h, which are identified by the DE 210, and registers the obtained Tx allowable range and Rx allowable range to the Tx training table 333 and the Rx training table, respectively. Furthermore, for example, the judgment processes in step S313 to S315 in FIG. 25 may be executed by the CPU 213 of the DE 210. In this case, the Tx allowable range and Rx allowable range for the transmission/reception units 310e to 310h are transmitted from the CPU 213 of the DE 210 to the parameter control unit 340 of the CM 300a only when it is judged that no error has occurred.

Figure 27:
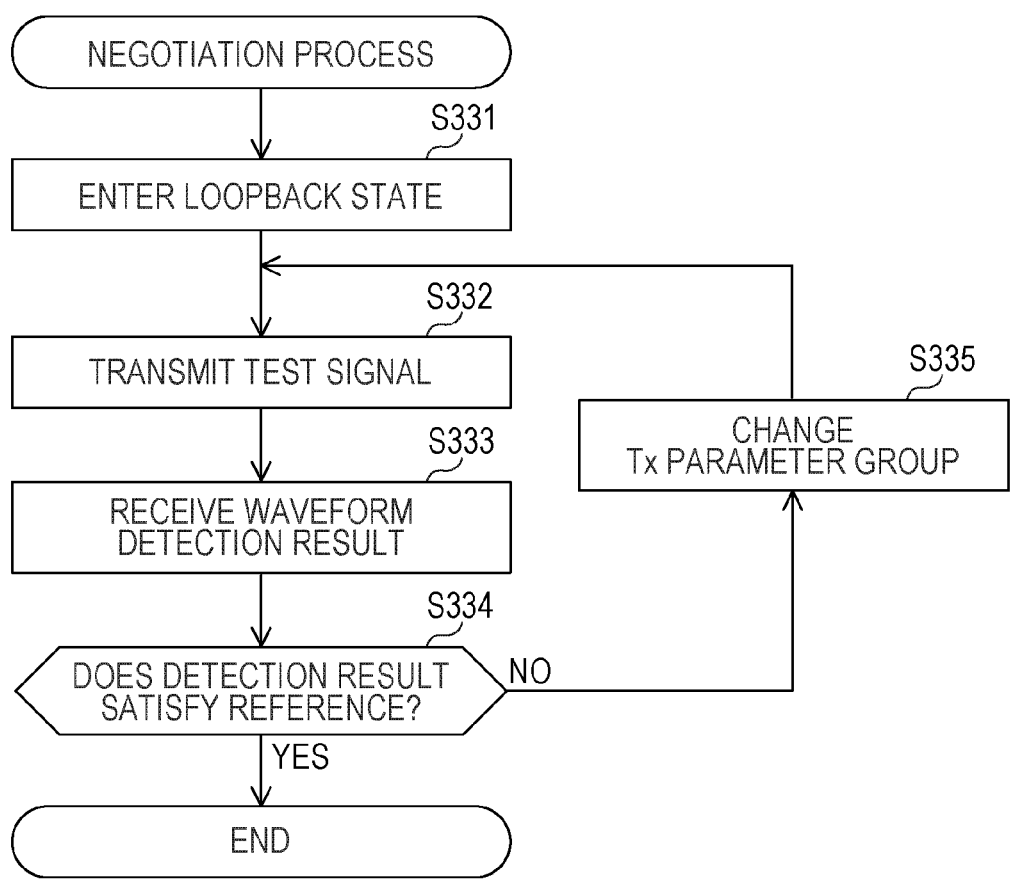
FIG. 27 is a flowchart illustrating an example of a negotiation process in a loopback state.

FIG. 27 is a flowchart illustrating an example of a negotiation process in the loopback state. The process illustrated in FIG. 27 is executed by an intended transmission/reception unit in step S302 in FIG. 24, step S322 in FIG. 26, or step S344 in FIG. 28 described below. If an initial Tx parameter group and an initial Rx parameter group have been specified by the parameter control unit 340 or the CPU 213 of the DE 210 before the process illustrated in FIG. 27 is executed, the specified initial Tx parameter group is set in the Tx equalizer 314 and the specified initial Rx parameter group is set in the Rx equalizer 315 when the process illustrated in FIG. 27 is started. In the following, the process illustrated in FIG. 27 will be described in accordance with step numbers.

Step S331: The control circuit 321 enters the loopback state in which signals flow through the signal lines 323a and 323b.

Step S332: The control circuit 321 causes the pulse generator 319 to output a test signal for negotiation. Accordingly, the test signal is transmitted from the Tx equalizer 314 to the Rx equalizer 315.

Step S333: The Rx equalizer 315 automatically adjusts Rx parameters to shape the waveform of the received test signal. The waveform detection circuit 320 notifies the control circuit 321 of the detection result of the shaped waveform. The control circuit 321 receives the detection result of the waveform.

Step S334: The control circuit 321 judges whether the detection result of the waveform satisfies a predetermined reference. If the detection result of the waveform does not satisfy the reference, the process proceeds to step S335. If the detection result of the waveform satisfies the reference, a set of values of a Tx parameter group and a set of values of an Rx parameter group which have been set in the Tx equalizer 314 and the Rx equalizer 315, respectively, at this time are determined as optimal values obtained by the negotiation. Then, the process ends.

Step S335: The control circuit 321 changes the setting values of the Tx parameter group in the Tx equalizer 314 in accordance with a result of comparison between the detection result of the waveform and the reference.

FIG. 28 is a flowchart illustrating an example (part 1) of a process for locating the site of failure. In the following, the process illustrated in FIG. 28 will be described in accordance with step numbers.

Step S341: The error processing unit 350 senses the occurrence of a communication failure. The error processing unit 350 also senses in which physical link the communication failure has occurred.

Step S342: The error processing unit 350 continues the operation using a wide port made up of physical links, except the physical link in which the communication failure has occurred. For example, if the communication failure has occurred in the physical link 32a, the error processing unit 350 continues the operation using the physical links 32b to 32d. In the following description, it is assumed that a communication failure has occurred in the physical link 32a.

Step S343: The error processing unit 350 notifies the management terminal 130 of a warning. The warning allows the administrator to identify the occurrence of a communication failure. The error processing unit 350 may further notify the management terminal 130 of which physical link the communication failure has occurred in.

Step S344: The error processing unit 350 instructs the transmission/reception units 310a and 310e connected to the physical link 32a in which the communication failure has occurred to perform a negotiation in the loopback state. The instruction for the transmission/reception unit 310e to perform a negotiation is transmitted to the CPU 213 of the DE 210 via a wide port made up of, for example, the physical links 32b to 32d. The CPU 213 instructs the transmission/reception unit 310e to perform a negotiation in accordance with the received instruction.

The transmission/reception unit 310a enters the loopback state in which signals flow through the signal lines 323a and 323b, and executes a negotiation between the Tx equalizer 314 and the Rx equalizer 315 in the transmission/reception unit 310*a*. Accordingly, a set of values of a Tx parameter group and a set of values of an Rx parameter group for the transmission/reception unit 310*a* are determined. The transmission/reception unit 310*a* transmits the determined set of values of the Tx parameter group and the determined set of values of the Rx parameter group to the error processing unit 350.

The transmission/reception unit 310*e* enters the loopback state in which signals flow through the signal lines 323*a* and 323*b,* and executes a negotiation between the Tx equalizer 314 and the Rx equalizer 315 in the transmission/reception unit 310*e*. Accordingly, a set of values of a Tx parameter group and a set of values of an Rx parameter group for the transmission/reception unit 310*e* are determined. The transmission/reception unit 310*e* transmits the set of values of the Tx parameter group and the set of values of the Rx parameter group to the CPU 213, and the CPU 213 transmits the received set of values of the Tx parameter group and the received set of values of the Rx parameter group to the error processing unit 350 of the CM 300*a*.

Step S345: The error processing unit 350 receives the set of values of the Tx parameter group and the set of values of the Rx parameter group which are determined by the transmission/reception unit 310*a*. The error processing unit 350 further receives the set of values of the Tx parameter group and the set of values of the Rx parameter group which are determined by the transmission/reception unit 310*e*. Then, the process proceeds to step S351.

FIG. 29 is a flowchart illustrating an example (part 2) of the process for locating the site of failure. In the following, the process illustrated in FIG. 29 will be described in accordance with step numbers.

Step S351: The error processing unit 350 refers to the Tx allowable range table 334, and judges whether or not the set of values of the Tx parameter group determined by the transmission/reception unit 310*a* in the CM 300*a* falls within the Tx allowable range identified in step S303. If the set of values of the Tx parameter group does not fall within the Tx allowable range, the process proceeds to step S353. If the set of values of the Tx parameter group falls within the Tx allowable range, the process proceeds to step S352.

Step S352: The error processing unit 350 refers to the Rx allowable range table, and judges whether or not a set of values of the Rx parameter group which has been set in the Rx equalizer 315 of the transmission/reception unit 310*a* in the CM 300*a* falls within the Rx allowable range identified in step S303. If the set of values of the Rx parameter group does not fall within the Rx allowable range, the process proceeds to step S353. If the set of values of the Rx parameter group falls within the Rx allowable range, the process proceeds to step S354.

Step S353: The error processing unit 350 judges that the transmission/reception unit 310*a* is the site of the failure. Then, the process proceeds to step S359.

Step S354: The error processing unit 350 refers to the Tx allowable range table 334, and judges whether or not the set of values of the Tx parameter group determined by the transmission/reception unit 310*e* in the DE 210 falls within the Tx allowable range identified in step S312. If the set of values of the Tx parameter group does not fall within the Tx allowable range, the process proceeds to step S356. If the set of values of the Tx parameter group falls within the Tx allowable range, the process proceeds to step S355.

Step S355: The error processing unit 350 refers to the Rx allowable range table, and judges whether or not the set of values of the Rx parameter group set in the Rx equalizer 315 of the transmission/reception unit 310*e* in the DE 210 falls within the Rx allowable range identified in step S312. If the set of values of the Rx parameter group does not fall within the Rx allowable range, the process proceeds to step S356. If the set of values of the Rx parameter group falls within the Rx allowable range, the process proceeds to step S357.

Step S356: The error processing unit 350 judges that the transmission/reception unit 310*e* is the site of the failure. Then, the process proceeds to step S359.

Step S357: The error processing unit 350 judges whether or not the number of times the process of step S357 has been executed reaches a predetermined number of times. If the predetermined number of times is reached, the process proceeds to step S358. If the predetermined number of times is not reached, the error processing unit 350 increments the number of times the process of step S357 has been executed. Then, the process proceeds to step S344.

Step S358: The error processing unit 350 judges that the transmission path between the transmission/reception unit 310*a* and the transmission/reception unit 310*e* is the site of the failure.

Step S359: The error processing unit 350 causes information indicating the site of the failure (one of the transmission/reception units 310*a* and 310*e* and the transmission path) to be displayed on the management terminal 130. Then, the process ends.

The process described above enables the error processing unit 350 to locate the site of failure where a communication failure has occurred. Displaying the located site of failure allows the administrator to identify the site of failure so as to identify the parts to be replaced, resulting in the parts being replaced within a short time. Accordingly, the length of work involved in recovery from the occurrence of a communication failure may be reduced.

A negotiation in the loopback state for a physical link in which a communication failure has occurred involves comparison of the detection result of the waveform of a received test signal with a predetermined expected value to determine Tx parameters to be set. However, due to a difference in vendor between SAS controllers or a difference in the environment of installation, such as temperature, between SAS controllers, a value of the Tx parameter determined based on a fixed expected value may not necessarily optimize communication quality.

In contrast, a Tx allowable range in this embodiment, which serves as a criterion on which judgments in a loopback test can be based, is identified as an area having a certain width which includes all the setting values of the Tx parameters determined for all the physical links through loopback training before communication is initiated. The Tx allowable range is varied to obtain an optimum position in accordance with a difference in vendor between SAS controllers or a difference in the environment of installation, such as temperature, between SAS controllers.

Accordingly, judging whether a value of the Tx parameter determined through a negotiation in a loopback test is included in the Tx allowable range enables accurate judgment of whether a transmission/reception unit corresponding to a physical link in which a communication failure has occurred is in an abnormal condition, regardless of a difference in vendor or environment. Similar effects are found for Rx parameters in addition to Tx parameters. This makes it possible to accurately locate the site of the occurrence of failure.

If the transmission/reception unit 310*a* or the transmission/reception unit 310*e* fails to perform a negotiation in the loopback state due to its malfunction, the error processing unit 350 is not able to receive a Tx parameter group or an Rx parameter group. The error processing unit 350 may determine that the transmission/reception unit from which the error processing unit 350 has failed to receive a Tx parameter group or an Rx parameter group is the site of the failure.

The fourth embodiment has been described in the context of a function of locating the site of failure in communication between the SAS expander 306a and the SAS expander 211a. The function of locating the site of the failure is also applicable in a similar manner to communication between the following combinations: for example, between the SAS expander 306b and the SAS expander 211b, between the IOC 305a and the SAS expander 306b, and between the IOC 305b and the SAS expander 306a. The function of locating the site of the failure is also applicable to communication between the PCIe switch 303a and the PCIe switch 303b.

As described above, the information processing according to the first embodiment can be implemented by causing the information processing apparatus 10 to execute a program, and the information processing according to the second, third, and fourth embodiments can be implemented by causing the CMs 300a and 300b to execute a program. The programs can be recorded on a computer-readable recording medium. Examples of the recording medium may include a magnetic disk, an optical disk, a magneto-optical disk, and a semiconductor memory. Examples of the magnetic disk include a flexible disk (FD) and an HDD. Examples of the optical disk include a compact disk (CD), a CD-Recordable/Rewritable (CD-R/RW), a digital versatile disc (DVD), and a DVD-R/RW.

For the distribution of a program, for example, a portable recording medium having the program recorded thereon is provided. The program may be stored in a memory device of a separate computer and distributed via a network. A computer stores, for example, a program recorded on a portable recording medium (for example, the recording medium 30a or 30b) or a program received from another computer into a memory device (for example, the SSD 308a or 308b), and reads the program from the memory device for execution. The program read from the portable recording medium may be directly executed or a program received from another computer via a network may be directly executed. In addition, at least part of the information processing described above may be implemented by an electronic circuit such as a digital signal processor (DSP), an application specific integrated circuit (ASIC), or a programmable logic device (PLD).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
    an interface that communicates with another device through a plurality of physical links coupling the interface and the another device in parallel;
    a memory; and
    a processor coupled to the memory and configured to execute a process, the process including:
        determining a value of a setting parameter for setting a signal transmission characteristic for each of the plurality of physical links by performing a negotiation with the other device, the value determined being among a plurality of determined values corresponding to the plurality of physical links, respectively; and
        judging whether each of the plurality of determined values is correct by judging whether a difference between a maximum value and a minimum value among the plurality of determined values falls within a predetermined range,
    wherein, in the negotiation in the determining, changing the respective values of the setting parameter for the plurality of physical links in a state where a different initial value of the setting parameter has been set for each of the plurality of physical links, and determining the value of the setting parameter for each of the plurality of physical links at receipt of a negotiation termination notification from the other device, as the corresponding one of the plurality of determined values.

2. The information processing apparatus according to claim 1, the process further including:
    selecting, in a case where the difference between the maximum value and the minimum value among the plurality of determined values does not fall within the predetermined range as a result of the negotiation which is performed for a first time, a group of determined values from among the plurality of determined values so that a difference between a maximum value and a minimum value among the group of determined values falls within the predetermined range, and
    causing the determining to perform the negotiation for a second time for a remaining physical link other than physical links corresponding to the group of determined values among the plurality of physical links.

3. The information processing apparatus according to claim 2,
    wherein the negotiation for the second time is performed with a value of the setting parameter being set for the remaining physical link, the value of the setting parameter being different from a value set as an initial value for the remaining physical link when the negotiation was started to be performed for the first time.

4. The information processing apparatus according to claim 1,
    wherein in the determining, the negotiation is performed a plurality of times for each of the plurality of physical links while changing an initial value for each of the plurality of physical links each time the negotiation is performed, to obtain the plurality of determined values of the setting parameter for each of the plurality of physical links, and respective values of the setting parameter are determined, for transmission of data to the other device, based on the plurality of obtained values for each of the plurality of physical links.

5. The information processing apparatus according to claim 1, wherein the interface includes transmitters and receivers for the plurality of physical links, the transmitters being configured to transmit data to the other device, the receivers being configured to receive data from the other device,
    the process further including:
        performing a signal transmission test, in response to occurrence of a communication failure in a physical link among the plurality of physical links, with an output of a transmitter corresponding to the physical link among the transmitters and an input of a receiver corresponding to the physical link among the receivers that are connected to each other, and
determining a first setting value of the setting parameter for the physical link through the signal transmission test, and
wherein the judging judges whether the interface is a site of the occurrence of the communication failure in accordance with a result of judgment of whether the first setting value is included in a predetermined normal-condition range.

6. The information processing apparatus according to claim 5,
wherein, in the judging, in response to occurrence of the communication failure in the physical link, receiving a second setting value of the setting parameter which is determined for a counterpart transmitter and a counterpart receiver in the other device, the counterpart transmitter and the counterpart receiver being connected to the physical link,
wherein the second setting value is determined based on another signal transmission test which is performed with an output of the counterpart transmitter and an input of the counterpart receiver being connected to each other, and
wherein the judging further judges which of the interface, a circuit including the counterpart transmitter and the counterpart receiver, and a transmission path between the interface and the circuit is a site of the occurrence of the communication failure, in accordance with a result of judgment of whether the first setting value is included in the predetermined normal-condition range and in accordance with a result of judgment of whether the second setting value is included in another predetermined normal-condition range.

7. The information processing apparatus according to claim 5, wherein the process further including:
performing an initial signal transmission test with outputs of the transmitters and inputs of the receivers being connected to each other respectively for the plurality of physical links, before the interface starts communication with the other device, and determines initial setting values of the setting parameter, each of the initial setting values corresponding to one of the plurality of physical links, through the initial signal transmission test, and
wherein in the judging, a range having a certain width which includes the initial setting values, each corresponding to one of the plurality of physical links, is determined to be the predetermined normal-condition range.

8. The information processing apparatus according to claim 5,
wherein, in the signal transmission test, a test signal is transmitted from the transmitter to the receiver and the first setting value is determined in accordance with a result of comparison between an indicator indicating a state of reception of the test signal at the receiver and a predetermined reference.

9. A storage system comprising:
a memory device;
an interface that communicates with the memory device through a plurality of physical links coupling the interface and another device in parallel; and
a control device, the control device including:
determining a value of a setting parameter for setting a signal transmission characteristic for each of the plurality of physical links by performing a negotiation with the memory device, the value determined being among a plurality of determined values corresponding to the plurality of physical links, respectively, and
judging whether each of the plurality of determined values is correct by judging whether a difference between a maximum value and a minimum value among the plurality of determined values falls within a predetermined range,
wherein, in the negotiation in the determining, changing the respective values of the setting parameter for the plurality of physical links in a state where a different initial value of the setting parameter has been set for each of the plurality of physical links, and determining the value of the setting parameter for each of the plurality of physical links at receipt of a negotiation termination notification from the other device, as the corresponding one of the plurality of determined values.

10. A computer-readable non-transitory storage medium storing a communication control program for causing a computer to execute a process, the process comprising:
instructing an interface in the computer that communicates with another device through a plurality of physical links to execute a determination process, the plurality of physical links coupling the interface and the another device in parallel and the determination process being for determining a value of a setting parameter for setting a signal transmission characteristic for each of the plurality of physical links by performing a negotiation with the other device;
obtaining a plurality of determined values of the setting parameter, the value determined being among the plurality of determined values determined in the determination process for the plurality of physical links, respectively; and
judging whether each of the plurality of determined values is correct by judging whether a difference between a maximum value and a minimum value among the plurality of determined values falls within a predetermined range
wherein, in the negotiation in the determination process, changing the respective values of the setting parameter for the plurality of physical links in a state where a different initial value of the setting parameter has been set for each of the plurality of physical links, and determining the value of the setting parameter for each of the plurality of physical links at receipt of a negotiation termination notification from the other device, as the corresponding one of the plurality of determined values.

* * * * *